United States Patent
Doylend et al.

(10) Patent No.: US 10,281,322 B2
(45) Date of Patent: May 7, 2019

(54) LOW POWER, HIGH RESOLUTION SOLID STATE LIDAR CIRCUIT HAVING A MODULATOR TO MODULATE A BIT SEQUENCE ONTO A CARRIER FREQUENCY OF A RECEIVED OPTICAL SIGNAL

(71) Applicant: Intel Corporation, Santa Clara, CA (US)

(72) Inventors: Jonathan K. Doylend, Morgan Hill, CA (US); David N. Hutchison, Santa Clara, CA (US); John Heck, Berkeley, CA (US); Haisheng Rong, Pleasanton, CA (US); Daniel Grodensky, Haifa (IL); David Arbel, Haifa (IL); Israel Petronius, Haifa (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/786,575

(22) Filed: Oct. 17, 2017

(65) Prior Publication Data
US 2018/0156661 A1 Jun. 7, 2018

Related U.S. Application Data

(63) Continuation of application No. 14/998,183, filed on Dec. 26, 2015, now Pat. No. 9,823,118.

(51) Int. Cl.
*G01S 17/42* (2006.01)
*G01J 1/42* (2006.01)
(Continued)

(52) U.S. Cl.
CPC .......... *G01J 1/4228* (2013.01); *G01B 11/22* (2013.01); *G01S 7/484* (2013.01); *G01S 7/4813* (2013.01);
(Continued)

(58) Field of Classification Search
CPC ........ G01B 11/22; G01J 1/4228; G01S 17/10; G01S 17/42; G01S 17/88; G01S 7/4817; G01S 7/484; G02F 1/292
(Continued)

(56) References Cited

U.S. PATENT DOCUMENTS 6,198,528 B1 * 3/2001 Maynard ................. G01S 7/003
342/457
7,388,662 B2 6/2008 Cantin et al.
(Continued)

OTHER PUBLICATIONS

Doylend et al., "Hybrid Silicon Free-Space Source with Integrated Beam Steering", Silicon Photonics VIII, Proceedings of SPIE vol. 8629, 2013, 9 pages.
(Continued)

*Primary Examiner* — Que Tan Le
(74) *Attorney, Agent, or Firm* — Compass IP Law PC

(57) ABSTRACT

An optical circuit includes solid state photonics. The optical circuit includes a phased array of solid state waveguides that perform beamsteering on an optical signal. The optical circuit includes a modulator to modulate a bit sequence onto the carrier frequency of the optical signal, and the beamsteered signal includes the modulated bit sequence. The optical circuit includes a photodetector to detect a reflection of the beamsteered optical signal. The optical circuit autocorrelates the reflection signal with the bit sequence to generate a processed signal.

20 Claims, 10 Drawing Sheets

(51) Int. Cl.
*G01B 11/22* (2006.01)
*G01S 17/88* (2006.01)
*G01S 17/10* (2006.01)
*G01S 7/481* (2006.01)
*G01S 7/484* (2006.01)
*G02F 1/29* (2006.01)

(52) U.S. Cl.
CPC ............ *G01S 7/4817* (2013.01); *G01S 17/10* (2013.01); *G01S 17/42* (2013.01); *G01S 17/88* (2013.01); *G02F 1/292* (2013.01)

(58) Field of Classification Search
USPC .................................................. 250/221, 216
See application file for complete search history.

(56) References Cited

U.S. PATENT DOCUMENTS

| | | | |
|---|---|---|---|
| 9,519,052 | B2 | 12/2016 | Gusev |
| 9,575,341 | B2 | 2/2017 | Heck et al. |
| 9,658,322 | B2 | 5/2017 | Lewis |
| 2016/0061935 | A1 | 3/2016 | McCloskey et al. |
| 2016/0299228 | A1 | 10/2016 | Maleki et al. |
| 2017/0016990 | A1 | 1/2017 | Yaacobi et al. |
| 2017/0153528 | A1 | 6/2017 | Kim et al. |
| 2017/0168162 | A1 | 6/2017 | Jungwirth |
| 2017/0199277 | A1 | 7/2017 | Villeneuve et al. |

OTHER PUBLICATIONS

Doylend et al., "Two-Dimensional Free-Space Beam Steering with an Optical Phased Array on Silicon-on-Insulator", Oct. 18, 2011, Optics Express 21595, 10 pages.

Hulme et al., "Fully Integrated Hybrid Silicon Two Dimensional Beam Scanner", Mar. 9, 2015, 14 pages.

Johnson et al., "Range Precision of Direct Detection Laser Radar Systems", Laser Radar Technology and Applications IX, Proceedings of SPIE vol. 5412, Bellingham, WA, 2004, 15 pages.

Kravitz et al., "High-Resolution Low-Sidelobe Laser Ranging Based on Incoherent Pulse Compression", IEEE Photonics Technology Letters, vol. 24, No. 23, Dec. 1, 2012, 3 pages.

Liao, et al., "40 Gbit/s Silicon Optical Modulator for High-speed Applications", Electronics Letters, vol. 43, No. 22, Oct. 25, 2007, 2 pages.

Ye et al., "Experimental Investigation of Optical Beam Deflection Based on PLZT Electro-optic Ceramic", Dec. 4, 2007, Optics Express 16933, 12 pages.

\* cited by examiner

LOW POWER, HIGH RESOLUTION SOLID STATE LIDAR CIRCUIT HAVING A MODULATOR TO MODULATE A BIT SEQUENCE ONTO A CARRIER FREQUENCY OF A RECEIVED OPTICAL SIGNAL

PRIORITY

This application is a continuation of, and claims the benefit of priority of, U.S. patent application Ser. No. 14/998,183, filed Dec. 26, 2015.

FIELD

Embodiments of the invention are generally related to optical devices, and more particularly to LIDAR (light detection and ranging) devices.

COPYRIGHT NOTICE/PERMISSION

Portions of the disclosure of this patent document may contain material that is subject to copyright protection. The copyright owner has no objection to the reproduction by anyone of the patent document or the patent disclosure as it appears in the Patent and Trademark Office patent file or records, but otherwise reserves all copyright rights whatsoever. The copyright notice applies to all data as described below, and in the accompanying drawings hereto, as well as to any software described below: Copyright © 2015, Intel Corporation, All Rights Reserved.

BACKGROUND

There is an increasing demand for three dimensional (3D) video or image capture, as well as increasing demand for object tracking or object scanning. Thus, the interest in 3D imaging is not simply to sense direction, but also depth. Longer wavelength signals (such as radar) have wavelengths that are too long to provide the sub-millimeter resolution required for smaller objects and for recognition of finger gestures and facial expressions. LIDAR (light detection and ranging) systems use optical wavelengths, and can provide finer resolution. A basic LIDAR system includes one or more light sources and photodetectors, a means of either projecting or scanning the light beam(s) over the scene of interest, and one or more control systems to process and interpret the data. Scanning or steering the light beam traditionally relies on precision mechanical parts, which are expensive to manufacture, and are bulky and consume a lot of power.

A known issue with ranging systems based on reflected signals is that detection relies on collecting reflected signal energy from diffuse surfaces. It is known that scattered optical power degrades as the square of the distance, and since the probe light scatters in all directions off the target object this leads to limitations on the range over which a reflected signal can be detected with sufficient signal-to-noise ratio (SNR). The range can be improved by increasing the size of the receiver collection optics, which allows for capturing more of the reflected signal, but the increased size limits application of the device. Collection of optical pulses over a long period of time together with techniques such as averaging or narrowband filtering can also be used to increase SNR, but such techniques require increased dwell time on a portion of the field of view, thus limiting the frame rate with which the system can monitor the target. Additionally, the periodic nature of the pulse patterns leads to ambiguity in the timing of the returned signal, which increases ambiguity with respect to the precise range to the target.

Finally, recording the range to the target with high precision is dependent on the precision with which the timing of returned pulses can be recorded. The timing with which the returned pulses can be recorded in turn either requires pulse widths comparable to the depth resolution, or requires that the pulses be recovered with sufficient SNR to distinguish their peak from the rest of the pulse. This tradeoff between pulse width, dwell time, and SNR is known as the Cramer-Rao lower bound. Thus, obtaining a usable echo in implementation requires a certain minimum energy to be transmitted in order to maintain sufficient signal to noise ratio for detection of the target.

To capture sufficient reflected power to detect objects at several meters distance at even VGA (video graphics array) resolution and frame rates using compact collection optics traditionally requires the use of transmit powers that pose eye-safety risks. In addition to posing risks for eye safety, such high-power transmit or output power is incompatible with portable or wearable devices. However such systems are typically not easily integrated into a small form-factor together with a means of scanning the optical beam across the field of view.

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" are to be understood as describing a particular feature, structure, and/or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

Figure 1:
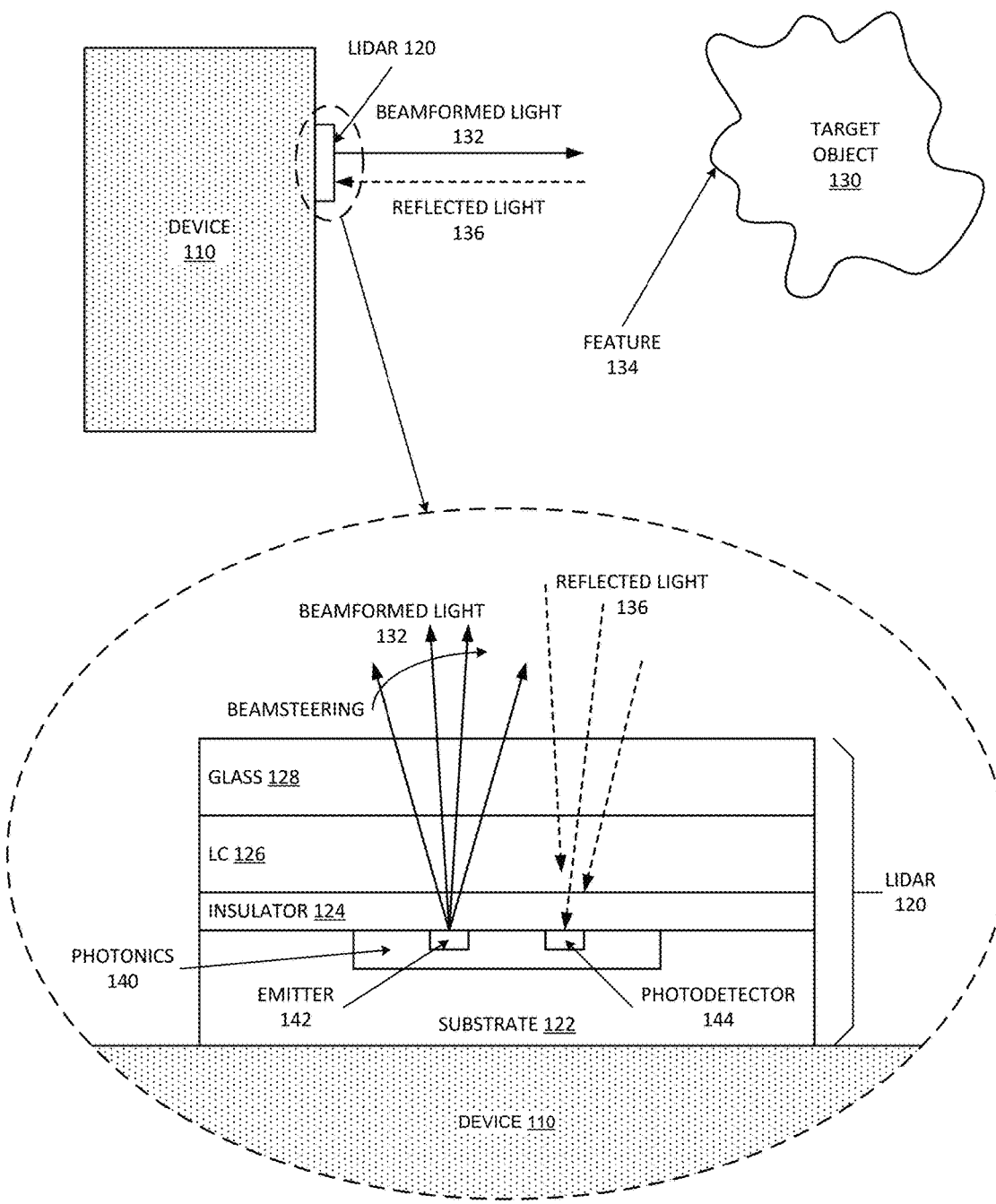
FIG. 1 is a block diagram of an embodiment of a system with an integrated solid state LIDAR circuit.

Descriptions of certain details and implementations follow, including a description of the figures, which may depict some or all of the embodiments described below, as well as discussing other potential embodiments or implementations of the inventive concepts presented herein.

DETAILED DESCRIPTION

As described herein, an optical circuit includes solid state photonics. The optical circuit includes a phased array of solid state waveguides that perform beamsteering on an optical signal. The optical circuit includes a modulator to modulate a bit sequence onto the carrier frequency of the optical signal, and the beamsteered signal includes the modulated bit sequence. The optical circuit includes a photodetector to detect a reflection of the beamsteered optical signal. The optical circuit autocorrelates the reflection signal with the bit sequence to generate a processed signal. The modulated signal can be lower power than a traditional signal because of the modulated bit sequence. The autocorrelation can generate a processed signal that provides higher depth resolution than traditional integrated optics circuits. Thus, the optical circuit can use low power and still provide high resolution detection.

In one embodiment, the photonics circuit includes a LIDAR (light detection and ranging) circuit with a semiconductor-based steerable laser. The optical frequencies of LIDAR enables gesture recognition and spatial mapping at high frame rates with millimeter precision due to the spatial resolution afforded by the small wavelength (on the order of hundreds of nanometers) and diffraction limit of light. In one embodiment, a LIDAR system outputs near-infrared light (having a wavelength of approximately 700 nm), which is not visible to the human eye and is compatible with commercially available components. Near-infrared signals are compatible with integrated semiconductor optics based on phased array technology, which can steer a beam across the field of view at high speed without the need for mechanically moving parts. Such an integrated optical system can include a photonic chip that combines a laser and beamsteering circuitry.

LIDAR relies on collecting reflected light from diffuse surfaces, and the signal degrades with the square of the distance. The degradation of the signal results in low signal to noise ratio (SNR) in the reflected signal. The low SNR typically demands a tradeoff between optical power in a transmitted pulse, precision of the depth detection, and dwell time. The optical power refers to the amount of current driven through the laser to create the optical signal, with increased current resulting in higher optical intensity/energy, which results in more reflections. Precision of the depth detection refers to the feature size of detection desired in the system, with lower precision possible with lower SNR. Dwell time refers to how long the LIDAR sweeps the target before generating a detection signal. Longer dwell time can allow the optical system to perform more precise detection.

Traditional approaches to LIDAR use high power optical signals to improve the SNR and capture sufficient reflected power to detect objects at a distance of several meters. VGA (video graphics array) resolution and frame rates for such distant objects has traditionally required optical power at levels in the hundreds of milliwatts that are not generally eye-safe, and levels that are incompatible with the power consumption requirements of portable and wearable devices. Portable and wearable devices can include smartphones as well as dedicated optical devices and camera equipment. VGA resolution and frame rates refers to resolutions that support approximately 640×480 pixel resolution, and typically at 60 Hz refresh rates. Other resolutions and frame rates are possible, but result in similar requirements for a dwell time per pixel of less than 60 ns.

In one embodiment, a LIDAR optical circuit includes a modulator to modulate a bit sequence onto the carrier optical signal. The optical system autocorrelates the reflection signals against the bit sequence to generate a data signal. In one embodiment, the modulator can be referred to as a high speed modulator. It will be understood that high speed can be a relative term, but for purposes herein, high speed can refer to a signal that enables the use of a pseudorandom bit sequence at least 64 bits in length during the dwell time of the laser on a pixel of the field of view. For example, for a dwell time of 60 ns per pixel (as requires for VGA resolution at 60 Hz frame rate), use of a 64-bit pattern would require a 1 GHz signal, which can be considered high speed. A signal length of 1024 bits could provide approximately 16 times more precise autocorrelation and therefore ranging precision, but would require a 16 GHz signal which can also be considered a high speed signal. Thus, in one embodiment, a high speed modulator can refer to a modulator that modulates a high speed bit pattern signal onto the carrier optical frequency.

Integrating a high speed modulator into a LIDAR circuit can improve the power/precision/dwell tradeoff constraints when combined with solid state beamsteering. Applying both solid state beamsteering and high speed modulation enables an optical circuit to transmit a bit pattern instead of a single pulse, where the bit pattern is known to the receiver. When the receiver knows the expected bit pattern, it can perform autocorrelation of the known signal with the returning "echo" or reflection signal, which can significantly improve the SNR and lower the optical power needed for equivalent resolution detection.

In one embodiment, an optical circuit applies or modulates a pseudorandom bit sequence (PRBS) or other coded pattern that allows for high processing gain. For example, a system can apply Golay complementary codes. Semiconductor optical circuits (such as silicon photonics) are capable of generating GHz-speed modulation in optical signals. In one embodiment, a LIDAR system based on silicon photonics or other optical circuit that enables GHz-speed modulation applies patterns measuring hundreds or even thousands of bits in length to interrogate each point in the far field without compromising frame rate or resolution.

In such a system, the SNR is improved by longer bit patterns without adding ambiguity in the timing/ranging since the pattern is non-periodic. By integrating pseudorandom sequence generation with autocorrelation into solid state beamsteering optics, a system enables non-mechanical scanning from a small form-factor solution with SNR and performance that is traditionally achievable only in much larger, less power efficient, and which require more processing and mechanical complexity.

The traditional use of a modulator in an optical circuit allows establishment of a communication link by encoding the signal which is to be transmitted onto the optical signal. The modulated signal carries information to the other end of the communication link. The application of a modulator to an optical system as described herein modulates a known signal onto the optical carrier. The known signal enables improved noise rejection in a signal reflection or echo. The improved noise rejection enables higher depth perception or smaller feature detection by being able to precisely detect time of flight information for the target object.

A LIDAR circuit as described herein can be one example of a LIDAR circuit in accordance with an embodiment of an optical circuit described in U.S. patent application Ser. No. 14/318,604, entitled: "SOLID STATE LIDAR CIRCUIT," and filed Jun. 28, 2014. The following provides a description of possible aspects of such an optical circuit.

In one embodiment, a solid state photonics circuit includes an array of waveguides disposed in either a semiconductor or an insulator, and a means of phase tuning the optical signals in the waveguides in order to steer the recombined beam. The phase steering mechanism can be thermooptic as described in [3], in which electrical heating elements incorporated near the waveguides are used to change the optical phase of the signals, or electrooptic in which an applied voltage is used to change the phase or absorption of the optical mode through the well-known Franz Keldysh effect or the well-known Quantum Confined Stark Effect, or electrooptic in which a diode or capacitor incorporated into the waveguide is used to alter either the concentration of electrical charge interacting with the optical mode, thus altering the phase through the well-known effect of plasma dispersion, or using a liquid crystal (LC) layer (which can specifically be liquid crystal on silicon (LCOS) when silicon photonics are used) selectively adjacent to the waveguides. The waveguides have an adjacent insulating layer (e.g., oxide), where the insulating layer has an opening to expose the array of waveguides to the LC layer. The LC layer can provide tuning for the array of waveguides by controlling the application of voltage to the liquid crystal. The voltage applied to the LC layer can separately tune all the waveguides. Applying different voltages to the LC layer can create phase shifts to steer the beam of laser light passing through the waveguides. In one embodiment, the opening in the insulator exposes more or less of different waveguides to produce a different phase shifting effect for each different waveguide.

It will be understood that LCOS beamsteering is only one example of a possible semiconductor steering mechanism that can be used in a solid state LIDAR as referred to herein. In one embodiment, a LIDAR system in accordance with what is described herein includes LC-based beamsteering. In one embodiment, a LIDAR system in accordance with what is described herein includes a thermo-optic phase array. A thermo-optic phase array is an array of waveguides with resistive heaters placed in proximity of the waveguides. Control logic applies a current to the resistive heaters to create more or less heat. Based on the change in temperature, the phase of signals in the waveguides will vary. Control over the heating can control the phase of the signals and steer the beam.

In one embodiment, a LIDAR system in accordance with what is described herein includes an electro-optic phase array. An electro-optic phase array refers to an array of waveguides integrated with electrodes for application of either current or voltage to enable phase control via electro-optic deflection or modulation. Based on changing voltage or current levels, the material's electro-optical properties cause a change in transmission of the optical signal through the waveguides based on changes to one or more applied voltages or currents. Thus, control of the voltage or current can control phase of the signals in the waveguides and steer the beam. A LIDAR system can thus provide a steerable laser via electro-optical modulation, thermo-optical phase adjustment, liquid crystal beamsteering, or other beamsteering mechanism that can be integrated with a waveguide array on a LIDAR integrated circuit.

The use of solid state photonics allows the integration of photonics components in a semiconductor substrate (e.g., silicon-based photonics in a silicon substrate, and/or III-V based photonic elements integrated with a silicon substrate). The photonics components can include waveguides and combiners for routing light, passive elements that enable phased arrays for beam forming, one or more couplers to redirect light perpendicular to the photonics substrate, and can include lasers, modulators, and/or detectors. In one embodiment, the semiconductor photonics is silicon based, which allows the use of a standard silicon photonic transmitter wafer. In one embodiment, the silicon photonics processing incorporates III-V elements (e.g. Indium phosphide or Gallium Arsenide) integrated with the silicon for purposes of lasing, amplification, modulation, or detection. In one embodiment, the standard silicon photonics processing is extended to process liquid crystal onto the silicon photonics. The LC enables a voltage-dependent change in the refractive index, which can enable both x and y beamsteering or beamforming. Again, other forms of integrated phase control could alternatively be used, such as thermo-optic phase control or electro-optic phase control.

A basic LIDAR system includes one or more laser sources and photodetectors, a means of scanning the beam(s) over the scene of interest or the target, and control logic to process the observed data. In one embodiment, the use of photonics processing extended with an integrated phase control mechanism can enable the integration of a LIDAR engine on a single chip, compatible with wafer-scale manufacturing technologies. The light sources and detectors (e.g., lasers and photodetectors (PDs)) can be created on the same chip, or coupled to the solid state LIDAR engine. In either case, the solid state LIDAR engine provides a LIDAR engine with no moving parts, and which can be manufactured at much lower cost than traditional LIDAR engines. Additionally, the use of semiconductor processing techniques allows the device to be low power and to have a much smaller form factor than traditionally available. Additionally, the resulting LIDAR circuit does not need the traditional precision mechanical parts, which not only increase costs, but suffer from vibration and other environmental disturbances. Furthermore, the solid state LIDAR would not require hermetic sealing on the packaging, which is traditionally necessary to avoid dust and humidity from clogging the mechanics of the LIDAR system.

Reductions in power and size combined with improvements in reliability (reduced sensitivity to environmental factors) can increase the applications of 3D imaging. 3D imaging with a solid state LIDAR can improve functionality for gaming and image recognition. Additionally, 3D imaging can be more robust for applications in replication of objects for 3D printing, indoor mapping for architecture or interior design, autonomous driving or other autonomous robotic movements, improved biometric imaging, and other applications. In one embodiment, the solid state LIDAR described herein can be combined with inertial measurement circuits or units to allow high resolution 3D imaging of a scene. Such a combined device would significantly improve on the low resolution of conventional LIDAR system. The low resolution of traditional LIDAR system is due to raster scanning a discrete series of point, which degrades spatial resolution.

A LIDAR circuit as described herein is not necessarily one example of such a LIDAR circuit described in U.S. patent application Ser. No. 14/318,604. To the extent that the following descriptions of the drawings appear to conflict with descriptions of that patent application, the descriptions below can be understood to supersede the previous patent application for purposes of the optical circuits described herein. To the extent such LIDAR technology is used, the LIDAR circuit can be extended in accordance with what is described herein, to enable the modulation of a known bit pattern and the autocorrelation of a signal reflection with the known bit pattern to improve detection, even at lower transmission power.

FIG. 1 is a block diagram of an embodiment of a system with an integrated solid state LIDAR circuit. System 100 represents any system in which a solid state LIDAR that provides solid state beamsteering and applies modulation can be used to provide 3D imaging. The solid state LIDAR can be referred to as a LIDAR engine circuit or LIDAR circuit. Device 110 includes LIDAR 120 to perform imaging of target object 130. Target object 130 can be any object or scene (e.g., object against a background, or group of objects) to be imaged. Device 110 generate a 3D image of object 130 by sending beamformed light 132 (a light signal) and processing reflections from the light signal.

Object 130 can represent an inanimate object, a person, a hand, a face, or other object. Object 130 includes feature 134, which represents a feature, contour, protrusion, depression, or other three dimensional aspect of the object that can be identified with sufficient precision of depth perception. Reflected light 136 represents an echo or reflection that scatters off target object 130 and returns to LIDAR 120. The reflection enables LIDAR 120 to perform detection.

Device 110 represents any computing device, handheld electronic device, stationary device, gaming system, print system, robotic system, camera equipment, or other type of device that could use 3D imaging. Device 110 can have LIDAR 120 integrated into device 110 (e.g., LIDAR 120 is integrated onto a common semiconductor substrate as electronics of device 110), or mounted or disposed on or in device 110. LIDAR 120 can be a circuit and/or a standalone device. LIDAR 120 produces beamformed light 132. In one embodiment, LIDAR 120 also processes data collected from reflected light 136.

System 100 illustrates a close-up of one embodiment of LIDAR 120 in the rotated inset. Traditional LIDAR implementations require mechanical parts to steer generated light. LIDAR 120 can steer light without moving parts. It will be understood that the dimensions of elements illustrated in the inset are not necessarily to scale. LIDAR 120 includes substrate 122, which is a silicon substrate or other substrate in or on which photonics or photonic circuit elements 140 are integrated. In one embodiment, substrate 122 is a silicon-based substrate. In one embodiment, substrate 122 is a III-V substrate. In one embodiment, substrate 122 is an insulator substrate. Photonics 140 include at least an array of waveguides to convey light from a source (e.g., a laser, not specifically shown) to a coupler that can output the light as beamformed light 132.

The inset specifically illustrates liquid crystal beamsteering capability in LIDAR 120. It will be understood that alternative embodiments of LIDAR 120 can include integrated thermo-optic phase control components or electro-optic phase control components in photonic circuit elements 140. While not specifically shown in system 100, it will be understood that such applications represent an embodiment of system 100. Referring more specifically to the illustration, insulator 124 includes an opening (not seen in system 100) over an array of waveguides and/or other photonics 140 to selectively provide an interface between photonics 140 and LC 126. In one embodiment, insulator 124 is an oxide layer (any of a number of different oxide materials). In one embodiment, insulator 124 can be a nitride layer. In one embodiment, insulator 124 can be another dielectric material. LC 126 can change a refractive index of waveguides in photonics 140. The opening in insulator 124 can introduce differences in phase in the various light paths of the array of waveguides, which will cause multiple differently-phased light signals to be generated from a single light source. In one embodiment, the opening in insulator 124 is shaped to introduce a phase ramp across the various waveguides in the array of waveguides in photonics 140.

It will be understood that the shape in insulator 124 can change how much of each waveguide path is exposed to LC 126. Thus, application of a single voltage level to LC 126 can result in different phase effects at all the waveguide paths. Such an approach is contrasted to traditional methods of having different logic elements for each different waveguides to cause phase changes across the waveguide array. Differences in the single voltage applied to LC 126 (e.g., apply one voltage level for a period of time, and then apply a different voltage level) can dynamically change and steer the light emitted from LIDAR 120. Thus, LIDAR 120 can steer the light emitted by changing the application of a voltage to the LCOS, which can in turn change the phase effects that occur on each waveguide path. Thus, LIDAR 120 can steer the light beam without the use of mechanical parts. Beamformed light 132 passes through insulator 124, LC 126, and a capping layer such as glass 128. The glass layer is an example only, and may be replaceable by a plastic material or other material that is optically transparent at the wavelength(s) of interest. The arrows representing beamformed light 132 in the inset are meant to illustrate that the phases of the light can be changed to achieve a beam forming or steering effect on the light without having to mechanically direct the light.

In one embodiment, photonics 140 include an optical emitter circuit 142, which transfers light from waveguides within photonics towards target object 130 as beamformed light 132. In one embodiment, photonics 140 include a modulator to modulate a known bit sequence or bit pattern onto the optical signal that is emitted as beamformed light 132. In one embodiment, photonics 140 include one or more photodetectors 144 to receive reflected light 136. Photodetector 144 and photonics 140 convey received light to one or more processing elements for autocorrelation with the modulated bit sequence.

It will be understood that there are different types of LIDAR, including time-of-flight (TOF) and frequency modulated continuous wave (FMCW). In one embodiment, LIDAR 120 is a TOF LIDAR system. In a TOF LIDAR system the beam can be modulated or pulsed such that the amplitude changes in the received echo are compared and timed relative to the transmitted beam, and the timing from send to receive is used to determine time-of-flight and hence distance to the reflecting object.

Figure 2:
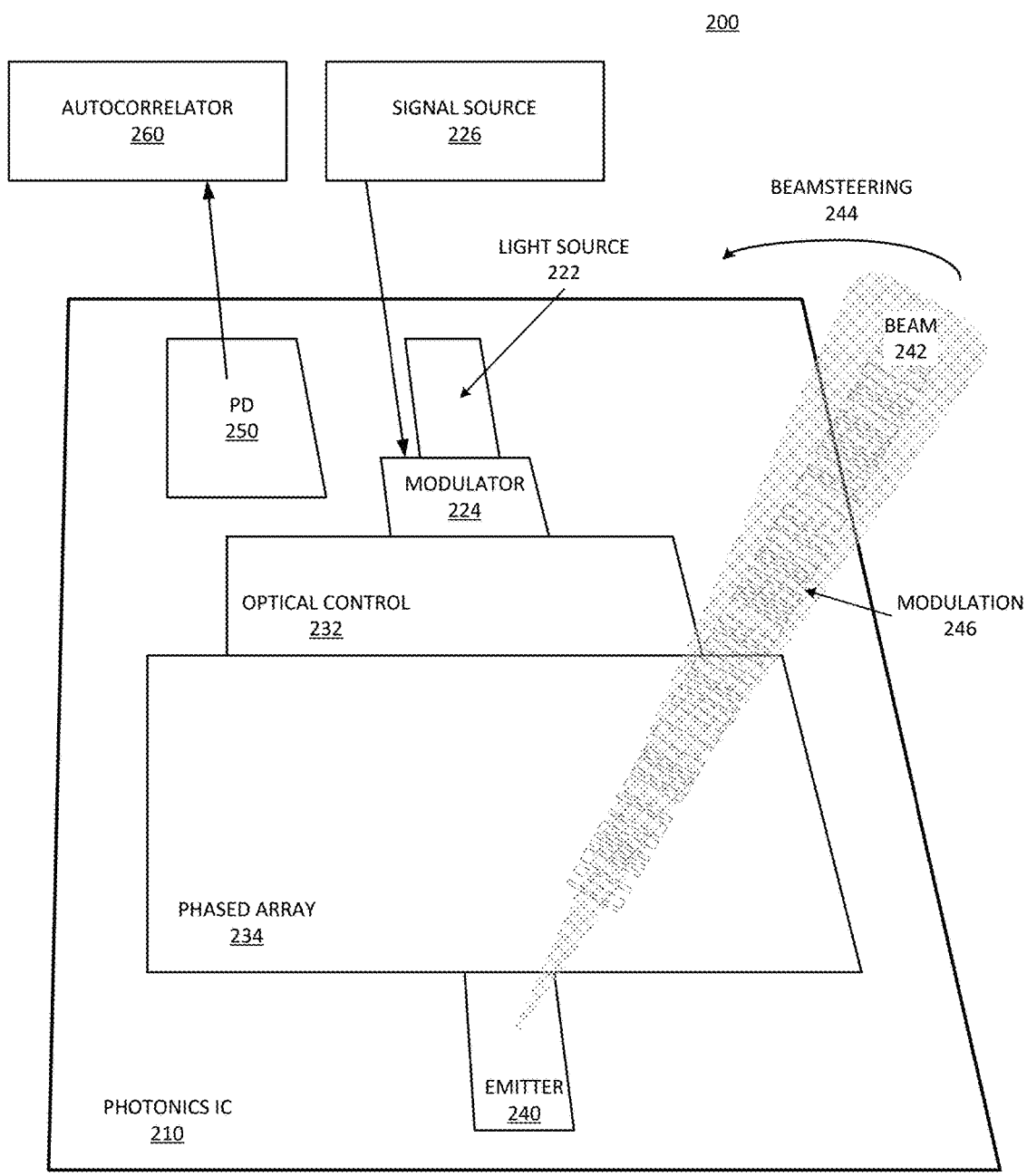
FIG. 2 is a block diagram of an embodiment of a system with an integrated solid state LIDAR circuit that autocorrelates a reflection signal with a known bit sequence.

FIG. 2 is a block diagram of an embodiment of a system with an integrated solid state LIDAR circuit that autocorrelates a reflection signal with a known bit sequence. System 200 provides one example of a LIDAR system in accordance with an embodiment of system 100. System 200 is illustrated in a format that might approximate an embodiment of an optical chip based on silicon photonics. It will be understood that components are not necessarily shown to scale, or shown in a practical layout. The illustration of system 200 is to provide one example of a LIDAR as described herein, without necessarily illustrating layout details.

Photonics IC (integrated circuit) represents a chip and/or circuit board on which photonics components are disposed. At a silicon-processing level, each component disposed on photonics IC 210 can be integrated via optical processing techniques to create active components (such as drivers, lasers, processors, amplifiers, and other components) and passive components (such as waveguides, mirrors, gratings, couplers, and other components). Other components are possible. At another level, photonics IC 210 may be a system on a chip (SoC) substrate, with one or more components integrated directly onto the substrate, and one or more components disposed as separate ICs onto the SoC. At a circuit board level, photonics IC 210 could actually be a PCB (printed circuit board) onto which discrete components (such as a laser and a coupler) are disposed in addition to a core LIDAR engine IC enabled to generate a steerable light source.

In one embodiment, photonics IC 210 includes light source 222, such as a laser. In one embodiment, light source 222 includes an off-chip laser. In one embodiment, light source 222 includes an integrated on-chip laser. An on-chip laser can be made, for example, from III-V semiconductor material bonded to a silicon-on-insulator chip substrate, with waveguides integrated in the silicon layer and gain provided by the III-V materials. Light source 222 passes an optical signal through modulator 224, which modulates a signal onto the optical carrier. Modulator 224 can be a high speed modulator. In one embodiment, modulator 224 can be a Mach-Zehnder modulator using either carrier depletion, carrier injection, or an applied electrical field to apply phase tuning to the two arms of an interferometer, thus creating constructive and destructive interference between the optical beams propagating in the two arms to induce amplitude modulation. In another embodiment, modulator 224 can be an electro-absorption modulator using carrier injection, carrier depletion, or an applied electrical field to cause absorption of the optical beam and thus induce amplitude modulation. In one embodiment, modulator 224 can be embodied in a silicon layer of system 200. In one embodiment where system 200 includes III-V material, modulator 224 can be integrated into the III-V material or both in silicon and III-V. The modulated signal will enable system 200 to autocorrelate reflection signals to perform depth detection of an object and/or environment. In one embodiment, signal source 226 represents an off-chip source of the bit pattern signal to be modulated onto the optical signal. In one embodiment, signal source 226 can be integrated onto photonics IC 210.

In one embodiment, modulator 224 passes the modulated optical signal to optical control 232. Optical control 232 represents elements within photonics IC 210 to can amplify, couple, select, and/or otherwise direct optical power via a waveguide to the phased array for phase control. Phased array 234 represents components on photonics IC 210 to apply variable phase control to separated optical signals to enable beamsteering by photonics IC 210. Thus, photonics IC 210 combines optical signal modulation with a LIDAR engine that generates steerable light. Emitter 240 represents an emitter mechanism, such as a grating coupler or other coupler that emits light off-chip from the on-chip waveguides.

Beam 242 represents a light beam generated by photonics IC 210. Beamsteering 244 represents how photonics IC 210 can steer beam 242 in x-y coordinates with respect to a plane of the surface of photonics IC 210 on which the components are disposed. While not necessarily to scale or representative of a practical signal, beam 242 is illustrated as being overlaid with modulation 246 to represent the modulation generated by modulator 224. Phase array 234 can include optical components and/or features to phase-offset a modulated optical signal split among various waveguides, with each phase-delayed version of the optical signal to be transmitted in turn, based on the delay. The delays introduced can operate to steer beam 242. In one embodiment, modulation 246 is a 20 Gb/s signal generated by modulator 224 to impress a long-code bit pattern sequence onto beam 242. In one embodiment, modulator 224 generates a 2 Gb/s signal. It will be understood that generally a higher modulation speed will further improve SNR (for example, see the example of FIG. 8).

To be a complete LIDAR system, system 200 includes one or more detectors to capture reflections of beam 242. In one embodiment, PD 250 represents a detector integrated with the LIDAR engine circuit. It will be understood that PD 250 can be on a separate chip from the beamsteering optics. Similarly, while photonics IC 210 is illustrated having integrated light source 222, a laser could be on a chip separate from the beamsteering optics. In one embodiment, PD 250 receives light from a reverse path of waveguides used to transmit beam 242. In one embodiment, PD 250 has a separate received light path.

PD 250 can be or include a high bandwidth photodiode and one or more amplifier circuits. PD 250 passes received light to autocorrelator 260. In one embodiment, autocorrelator 260 is off-chip from photonics IC 210. In one embodiment, autocorrelator 260 is part of a processor or controller that performs signal processing to determine depth information based on the received reflection and on the known bit sequence modulated onto the optical signal. In one embodiment, signal source 226 generates a pseudorandom bit sequence (PRBS) for modulator 224 to modulate onto a laser beam. A PRBS can be a sequence of pulse with white space between. In one embodiment, signal source 226 passes the bit sequence to modulator 224 and to autocorrelator 260. In one embodiment, signal source 226 generates a signal and stores it on photonics IC 210, such as in pre-deployment configuration and/or testing operations.

In one embodiment, a laser (e.g., light source 222), amplifier, modulator (e.g., 224), and/or detector (e.g., PD 250), or any combination thereof may be integrated on silicon using III-V material (e.g. Indium Phosphide based semiconductor incorporating various compatible quaternary or ternary compounds to act as quantum wells, contact layers, confinement layers, or carrier blocking layers). Such III-V components can be attached to the silicon or to an intermediate layer. In an embodiment using III-V material, the III-V material can provide gain, modulation, and/or absorption for optical modes which propagate through the silicon. Thus, III-V material can be used to integrate a laser, an amplifier, a modulator, and/or a photodetector on-chip.

In one embodiment, the bit pattern encoded by modulator 224 includes a long bit pattern. While "long" can be relative, in general the long bit pattern refers to a bit pattern in the hundreds or thousands of bits. The longer a bit pattern can be, the more it can improve SNR, although the length of the bit pattern needs to be weighed against the required dwell time (how long to hold a beam at a location in a sweep or steering) for the length of the bit pattern. By encoding a long bit pattern onto the signal, the timing of the return signal can be determined with higher precision by comparing the known transmitted pattern with the returned echo. In one embodiment, a bit pattern of 1112 bits in length showed a 26 dB improvement in SNR over a beam without the modulation, other conditions being the same. For implementations involving a limited dwell time of the beam on a particular point in the far field, such as when used in a rapidly scanning gesture recognition system, depth precision and low power operation can be enhanced by using a high bit rate for modulation in modulator 224. The higher bit rate enables a longer bit pattern to be encoded and transmitted without sacrificing scanning speed. Testing at bit rates of multiple Gb/s have demonstrated significant SNR improvements, and silicon photonics with integrated modulation are compatible with these bit rates as well as even higher bit rates in the tens of Gb/s for superior SNR without increasing dwell time on a particular pixel.

In one embodiment, the LIDAR system of system 200 is not a coherent detection system. With coherent detection, the system relies on coherently interfering the received echo with a reference signal. System 200 enables autocorrelation by comparing a reflected pulse or bit pattern with the transmitted pulse or bit pattern, where the two need not be interfered coherently. The system thus only needs information on the power of the reflected system, rather than its phase. The decoding includes comparing bit patterns rather than comparing phase of the signals. The timing information can be derived from the offset in the autocorrelation, which then indicates depth. It will be understood that shorter, repeated patterns could be applied by modulator 224. However, such repeated patterns introduce periodicity, making it difficult to determine what the offset is between the transmitted and received signals without ambiguity.

Figure 3A:
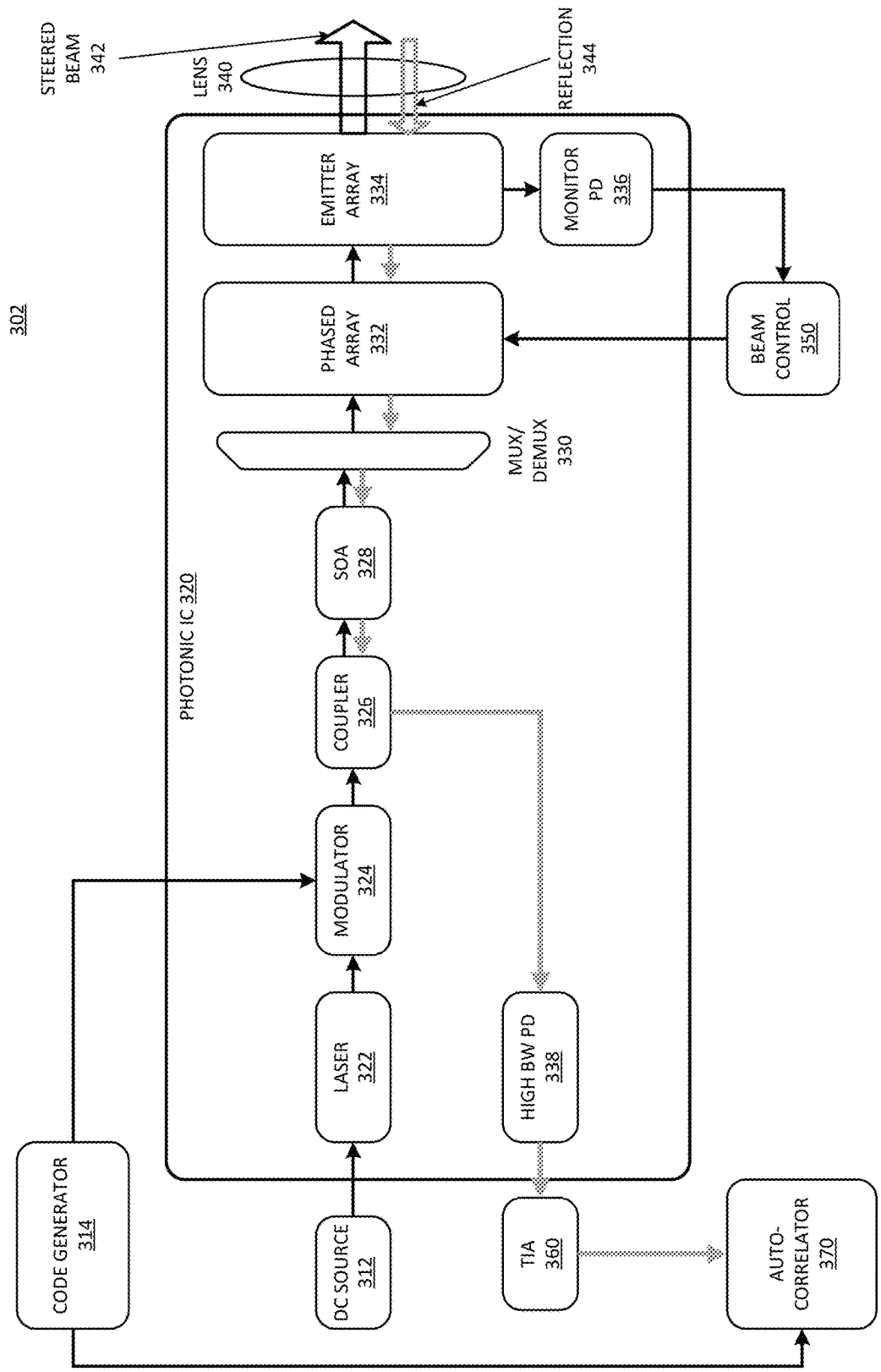
FIG. 3A is a block diagram of an embodiment of a photonic system that autocorrelates a reflection signal with a known bit sequence, with a single transmitter and receiver I/C.

FIG. 3A is a block diagram of an embodiment of a photonic system that autocorrelates a reflection signal with a known bit sequence, with a single transmitter and receiver I/C. System 302 illustrates one example of a photonic system in accordance with an embodiment of system 100 and/or an embodiment of system 200. Photonic IC 320 integrates optical/photonic components that enable modulating a bit sequence onto a steerable beam to transmit to a target. Photonic IC 320 further includes one or more detection components to receive signal reflections, and send the reflections for autocorrelation to determine depth information from the transmitted signal. In one embodiment, photonic IC 320 is a silicon photonics chip.

DC source 312 represents a power source for system 302. In particular, DC source 312 provides power to enable laser 322 to generate an optical signal or laser beam. In one embodiment, laser 322 includes a continuous-wave laser. In one embodiment, the modulation can be external modulation of a signal onto the laser which can enable the signal to be modulated independently of phase-steering. Alternatively, the laser can be pulsed to generate a bit pattern, in which case an external modulator may not be required. In one embodiment, the bit sequence modulation is performed via amplitude modulation. Thus, in one embodiment, modulator 324 represents an amplitude modulator or other modulator that inserts a data bit sequence onto the laser signal. Modulator 324 can be a high speed modulator, indicating that the bit sequence has a data rate at least 64 times higher than rate at which the optical signal is switched from one pixel to the next as it is scattered off the target. In one embodiment, code generator 314 generates a PRBS for modulation onto the carrier frequency of the optical signal. In one embodiment, code generator 314 represents an off-chip pseudorandom sequence generator. In one embodiment, code generator 314 generates a long code sequence, referring to a bit sequence being hundreds of bits or more. In one embodiment, code generator 314 is part of a processor that interfaces with photonic IC 320.

Coupler 326 represents an optical component to convey the modulated optical signal an amplifier component. SOA (semiconductor optical amplifier) 328 represents an optical component that amplifies the optical signal. SOA 328 amplifies the optical signal to split the signal into multiple waveguides. Mux/demux 330 represents a waveguide demultiplexer for transmitted signals and a waveguide multiplexer for received signals. Mux/demux 330 could alternatively be referred to as a splitter/combiner. The optical signal is split into multiple different waveguides in phased array 332. In one embodiment, beam control 350 generates a phase offset among the multiple waveguides of phased array 332. Thus, beam control 350 can change the relative phase of the signals and electrically steer the output beam, instead of using mechanical means to steer the beam. In one embodiment, photonics IC 320 includes monitor photodetector 336 to tap off optical power to feed back into beam control 350, to enable beam control 350 to appropriately adjust the beamsteering operation of phased array 332.

Phased array 332 conveys the signals to one or more emitter portions of emitter array 334 for transmission from photonic IC 320. Phased array 332 is steerable based on control signals from beam control 350. Phased array 332 and output emitter array 334 are integrated on a single chip with modulator 324 to generate and steer a beam encoded with a bit sequence towards a target. Emitter array 334 outputs steered beam 342 via lens 340 toward the target. In one embodiment, lens 340 is an adjustable lens, which can be focused differently to allow for wider or narrower transmission and reception. Wider transmission spreads the transmitted signal further. Wider reception enables focusing more reflected signals. Narrower transmission enables more focused transmission and can reduce scattering. Narrower reception reduces the amount of reflection light that might be received.

In one embodiment, reflection signal 344 returns via lens 340 through the coupler of emitter array 334, and is conveyed back through the waveguides of phased array 332, via mux 330 to SOA 328, and to coupler 326. In one embodiment, coupler 326 can couple a transmitted signal from modulator 324 to SOA 328, and can couple a received signal from SOA 328 to photodetector 338. In one embodiment, photodetector 338 is a high-bandwidth photodiode that receives the reflected signal for detection. In one embodiment photodetector 338 is integrated on-chip on photonics IC 320 with phased array 332, as illustrated. Thus, photodetector 338 can be integrated on a common substrate of photonics IC 320.

In one embodiment, photodetector 338 conveys the received signal to TIA (transimpedance amplifier) 360 to convert and amplify the optical signal into a digital signal. Autocorrelator 370 represents autocorrelation logic or circuitry for system 302. In one embodiment, autocorrelator 370 is part of a processor or signal processor associated with photonic IC 320. In one embodiment, autocorrelator 370 includes digital autocorrelation logic or circuitry, to apply digital signal processing techniques to compare the bit pattern of the received signal to the bit pattern generated by code generator 314. In one embodiment, autocorrelator 370 includes analog autocorrelation logic or circuitry to combine the received signal with the generated bit pattern to determine how long the signal took to return. With either digital or analog autocorrelation, system 302 can determine how long reflection 344 took to return, which can indicate how far away the target is.

It will be understood that the bit pattern modulated onto steered beam 342 enables system 302 to detect a much weaker signal reflection 344 than is possible without the bit pattern and autocorrelation processing. Thus, system 302 can enable the use of a lower power laser pulse, while still offering high precision range detection.

Figure 3B:
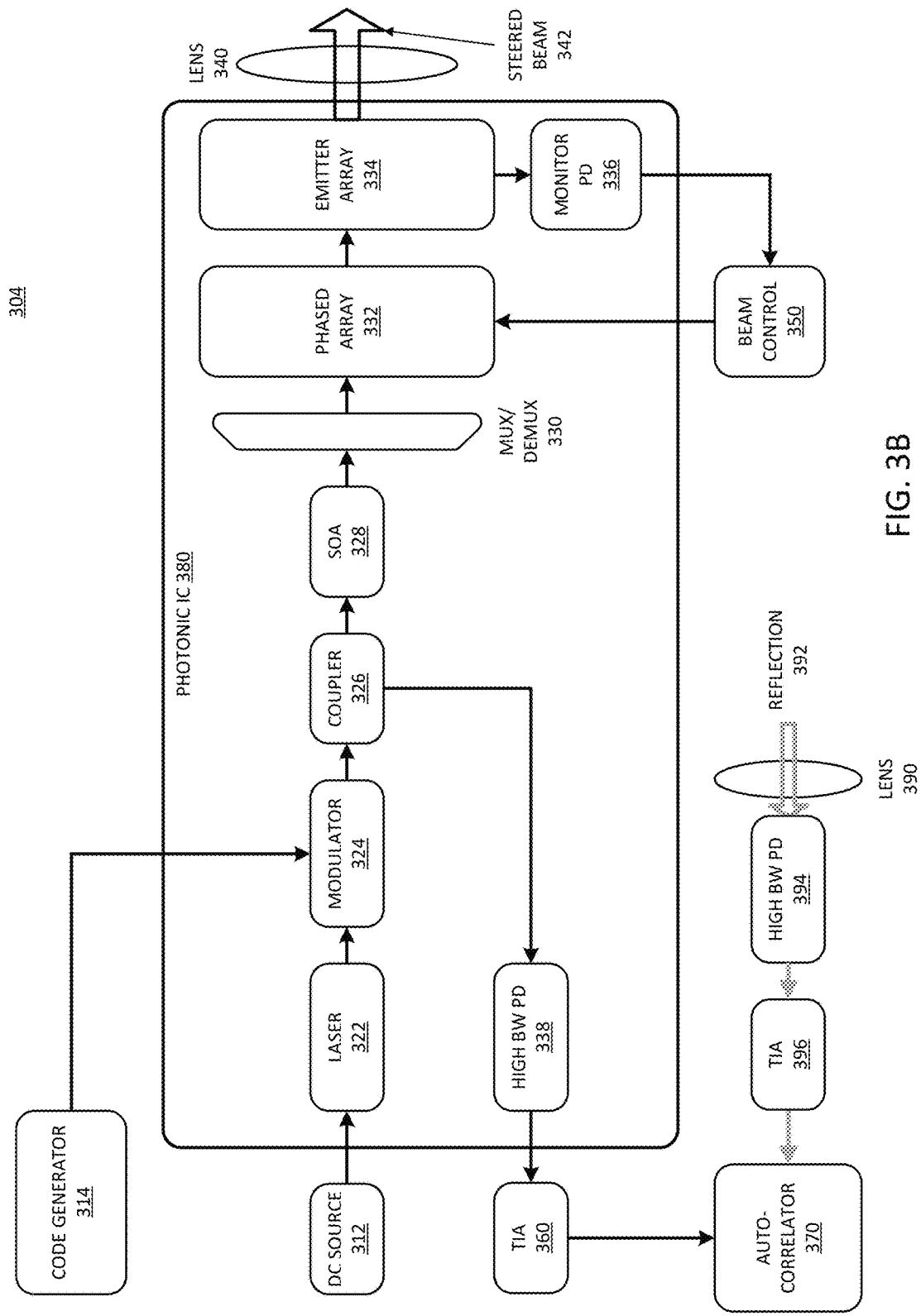
FIG. 3B is a block diagram of an embodiment of a photonic system that autocorrelates a reflection signal with a known bit sequence, with separate transmitter and receiver I/Cs.

FIG. 3B is a block diagram of an embodiment of a photonic system that autocorrelates a reflection signal with a known bit sequence, with separate transmitter and receiver I/Cs. System 304 illustrates one example of a photonic system in accordance with an embodiment of system 100 and/or an embodiment of system 200. System 304 is an alternative to system 302 of FIG. 3A. System 302 illustrates photonic IC 320 with an integrated photodetector 338 for receiving reflection signals. System 304 includes a photodetector off-chip from photonic IC 380. A single-chip design such as illustrated by system 302 provides noise reduction as light comes in through only a single lens to a single photonics IC. A two-chip design such as illustrated by system 304 provides more light to the detector, but with more ambient light.

When the receiver is on the same chip as the transmitter as in system 302, the reflection returns through the same collection lens and phased array used to steer the beam. When the receiver is on a separate chip as in system 304, the receiver chip will have a separate optical path for received light than the optical path for transmitted light of the transmitter chip. In either case, in one embodiment, the photonics IC can include a modulator to encode a bit pattern onto the beam for autocorrelation and improved SNR. In one embodiment, in either system the autocorrelation can be accomplished using a reference signal directly from the code generator that generates the bit sequence for modulation. In one embodiment, in either system the autocorrelation can be accomplished using the modulated output from the optical modulator and an additional high-bandwidth PD for so-called "true photonic monitoring."

Where components of system 304 are numbered the same as components of system 302, the description of the components can be considered to be the same or similar to what is described above. Photonic IC 380 integrates optical/photonic components that enable modulating a bit sequence onto a steerable beam to transmit to a target. Photonic IC 380 is separate from detection components to receive signal reflections, as illustrated by separate lens 380 and high bandwidth photodetector 384. The separate detector sends the reflections for autocorrelation to determine depth information from the transmitted signal. In one embodiment, photonic IC 380 is a silicon photonics chip.

DC source 312, laser 322, modulator 324, code generator 314, coupler 326, POA 328, mux 330, phased array 332, emitter array 334, monitor PD 336, and beam control 350 of photonic IC 380 can be the same as similar components in photonic IC 320 of system 302. As with system 302 system 304 includes lens 340, and emitter array 334 generates steered beam 342 for transmission to a target. Instead of receiving reflections via lens 340 for an on-chip photodetector, system 304 includes separate lens 390 to receive reflections 382. In one embodiment, high bandwidth photodetector 384 receives reflections 382 and sends them to TIA 386. TIA 386 can amplify the received optical signals and pass them to autocorrelator 370.

In one embodiment, autocorrelator 370 performs the autocorrelation with the modulated optical signal generated on photonic IC 380. In one embodiment, coupler 326 couples the modulated optical signal from modulator 324 to photodetector 338. In one embodiment, photodetector 338 passes the signal to TIA 360, which provides an amplified signal to autocorrelator 370.

Figure 4:
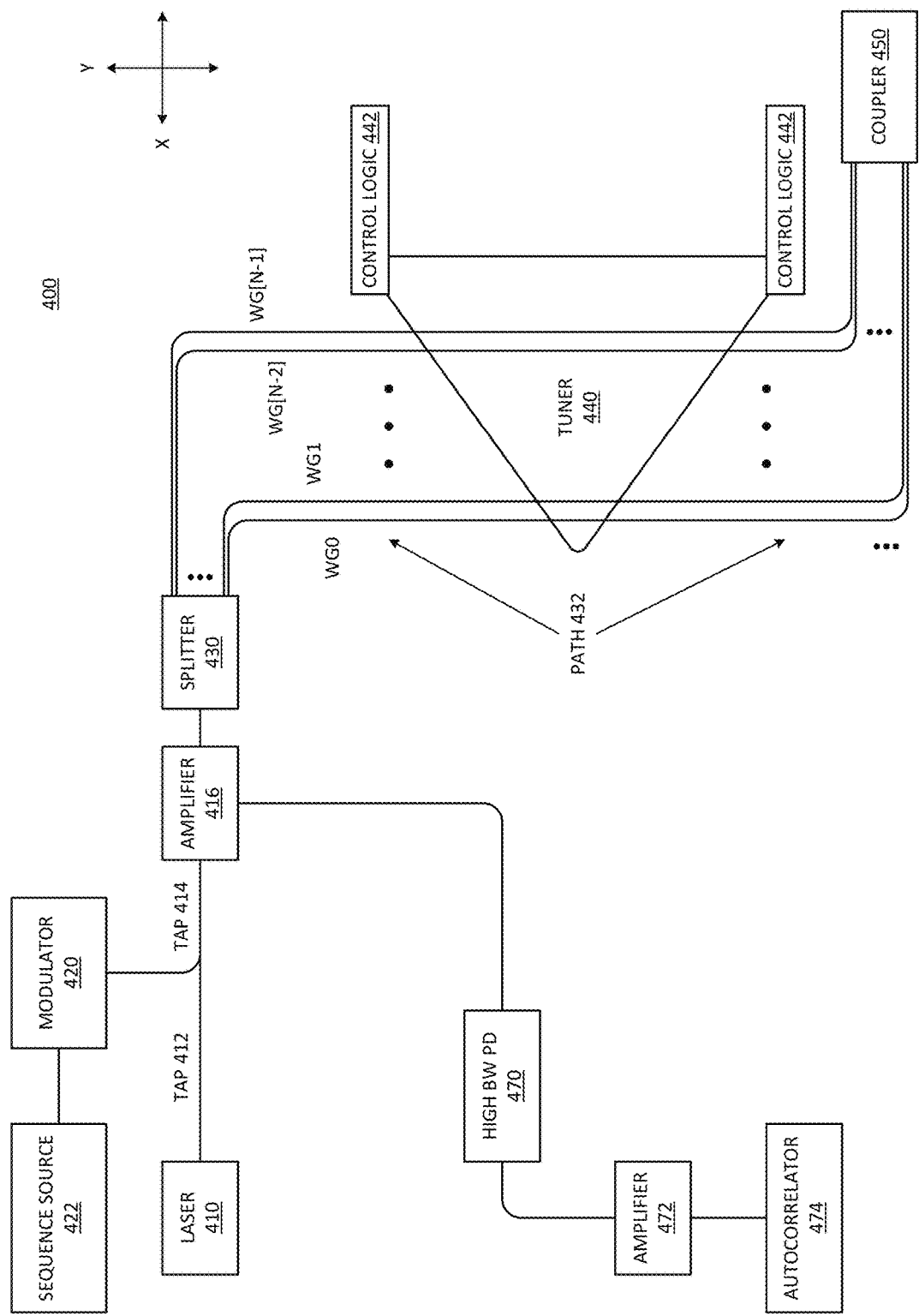
FIG. 4 is a block diagram of an embodiment of a top view of an integrated solid state LIDAR circuit.

FIG. 4 is a block diagram of an embodiment of a top view of an integrated solid state LIDAR circuit. System 400 represents elements including a solid state LIDAR circuit, which can be one example of a LIDAR in accordance with an embodiment of system 100, system 200, system 302, or system 304. In one embodiment, system 400 includes laser 410, which could be separate from the LIDAR circuit. Laser 410 is a light source for system 400. In one embodiment, laser 410 can be integrated on the same circuit as the LIDAR. Laser 410 could be integrated directly on the same substrate that includes the photonic components. Such an implementation can provide a self-contained steerable laser. Laser 410 could also be combined in a multichip package or system on a chip arrangement where laser 410 is a separate die combined in package and/or on the same substrate as the photonics. Laser 410 could also be included as a separate chip (off chip) from the LIDAR photonics.

In one embodiment, system 400 includes modulator 420. In one embodiment, modulator 420 can provide amplitude modulation to the laser signal. The amplitude modulation can be added, for example, to a pulsed laser. The amplitude modulation can include a bit sequence from sequence source 422 that provides a modulated bit signal. The modulated signal can enable autocorrelation with a known bit sequence for improved SNR in the reflected signal. In one embodiment, system 400 modulates the laser signal to impress a bit pattern upon it before directing it to the far field (to the target) and a detector times the echo. Other ranging implementations are possible.

In one embodiment, system 400 includes amplifier 416, which can include or be a semiconductor optical amplifier, for example a semiconductor optical amplifier composed of III-V material attached to a silicon substrate. In one embodiment, amplifier 416 can couple the modulated signal to high bandwidth photodetector (PD) 470. In one embodiment, PD 470 provides the signal to amplifier 472, which in turn provides the signal to autocorrelator 474. In one embodiment, reflection signals return via the same optical path as signals for transmission from system 400, which can be routed back to PD 470. Autocorrelator 474 performs autocorrelation on such a reflection compared to the bit sequence generated by sequence source 422, which could separately pass the bit sequence to the autocorrelator. In one embodiment, the path from amplifier 416 to PD 470 to amplifier 472 to autocorrelator 474 represents a path to pass the modulated transmit signal for autocorrelator 474 to use in autocorrelation with a separate reflection signal (e.g., via a detector not shown in system 400).

In one embodiment, system 400 includes splitter 430, which can be a demultiplexer or other mechanism that splits the source light from laser 410 into N channels, such as 8, 16, 24, or some other number of channels. The N channels are illustrated by waveguides 0 through [N−1] (WG[0] through WG[N−1]). The N channels or waveguides represent a phased array. N can be any number of channels that will provide proper resolution for the LIDAR. It will be understood that there are many different ways to split an optical signal. Splitter 430 can therefore vary from one implementation to another. In one embodiment, splitter 430 is or includes a multimode interference (MMI) coupler. In one embodiment, splitter 430 is or includes a star coupler.

From splitter 430, the light signal is carried through the array of waveguides or phased array along path 432, which is a path from splitter 430 to coupler 450. Coupler 450 allows system 400 to emit the light from the various channels. In one embodiment, path 432 includes right angle bends to route the waveguides to coupler 450. Bends in the waveguides can allow the introduction of spacing between the waveguides of the array, and are not necessarily right angle bends. The spacing can allow the introduction of phase offsets between the waveguides relative to each other. The phase offsets or phase shifting provides phase differences in the laser signal that enables beam forming and beam steering in the emitted wavefront. In one embodiment, it can be possible to introduce spacing differences in splitter 430, or in some other way in system 400; thus, the right angle bends in the array of waveguides may not be needed in one embodiment.

In one embodiment, path 432 passes the array of waveguides through tuner 440. Tuner 440 represents a mechanism in system 400 that introduces relative phase offsets in the various waveguides of the array. In one embodiment, tuner 440 includes an opening in an oxide layer (or other insulator layer or insulating layer, where oxide is used as a non-limiting example) that is adjacent the photonics components of the LIDAR. The opening in the oxide exposes the waveguide channels to the liquid crystal of an LCOS layer (or other LC layer, where LCOS is used as a non-limiting example) adjacent the oxide layer. In one embodiment, the opening can be triangular to expose the channels to more and more of the liquid crystal to create a linear phase shift across the channels. For example, assuming the triangular shape of tuner 440 to be the shape of the opening in the oxide, WG[0] is exposed to less of the liquid crystal than WG[1], because WG[0] is closer to the apex of the triangle than WG[1]. There is also less of WG[1] exposed to less of the liquid crystal than there would be for WG[2] (not explicitly shown), and so forth from one adjacent waveguide to another until WG[N−1], which is the most exposed to the liquid crystal. WG[N−1] is shown as being located nearest the base of the illustrated triangle. There would be a linear phase shift from WG[0] to WG[N−1] based on the voltage applied to the liquid crystal. Thus, the liquid crystal can act as a single tuner for all channels which steers the emitted beam from side to side.

It will be understood that instead of using an opening in the oxide and a voltage applied to a liquid crystal layer, system 400 could include control logic to introduce a delay signal to each waveguide individually. Such a tuning mechanism might require more power and would require significantly more logic than the LCOS tuning mechanism. Alternatively, system 400 can include thermo-optical components in proximity with the waveguides to control signal phase. Different size components and/or different current applications to different components can provide phase control over the signals in the waveguides. Alternatively, system 400 can include electro-optical components within the waveguide array to control signal phase. The application of different voltages or currents at different points of the array can provide phase control. In an embodiment with either thermo-optic components (not specifically shown) or electro-optic components (not specifically shown), tuner 440 can take on a different physical implementation in accordance with an appropriate integrated structure that enables the application of heat-based phase tuning, voltage-based phase tuning, or current-based phase tuning.

In an embodiment where LCOS is applied, it will be understood that the opening in the oxide layer does not have to match what is shown, but can be a right triangle, or could be a trapezoid or other shape. There could also be a configuration where the phase shifts are not linear from one side of the waveguide array to another, but different shapes of openings could be used to introduce other delay into the waveguide. For example, an opening could be formed to expose a waveguide in the middle of the array to the least amount of liquid crystal, and be of a complex shape that in some other way introduces different delays to the different waveguides. While the principles discussed would be the same for such configurations, the illustration of system 400 offers a simpler solution than such complex oxide opening patterning.

Control logic 442 represents logic in system 400 that can control the beam forming of light from the waveguides of the array. In one embodiment, system 400 includes control logic that interacts with an LCOS layer or other phase control circuitry to introduce phase shifting the in the waveguides. In one embodiment, system 400 includes control logic to interact with the waveguides to introduce the phase shifting. In one embodiment, system 400 includes control logic to interact with coupler 450 to control the emission of light from system 400. In one embodiment, system 400 includes control logic to align the signals in the various waveguides prior to introducing the desired phase offsets. For example, splitter 430 and/or path 432 could introduce different delays into the waveguide signals, relative to one another. Such delays would normally be considered within the operating tolerances of a photonics circuit. However, to carefully control the phase delay for purpose of controlling the beam forming of the signals, system 400 can compensate and/or account for other delays or phase shifts introduced into the waveguides. Thus, tuning can start with all channels having uniform phase, to more precisely introduce the desired phase delays. Alternatively, the shaping or operation of tuner 440 can compensate for expected phase delays introduced by the architecture of the photonics in system 400.

In one embodiment, system 400 can provide both X and Y beam steering, relative to the axes shown in system 400. A phased array as described, where phase shifting is introduced into different waveguides of the array, can provide x-axis beam steering. In one embodiment, system 400 includes one or more mechanisms to introduce a variable refractive index on the output of light from coupler 450, which can introduce y-axis beam steering.

The light or laser signal is output from system 400 by coupler 450. The direction of propagation of the signal from coupler 450 would typically be in a z-axis relative to the axes shown in system 400. The light signal is sent to the target to cause far field interference. Light will be reflected back toward system 400 as scattered light after interfering with the far field. It will be understood that a complete LIDAR system will include one or more detectors (e.g., photodetectors) to receive the reflected light that interfered in the far field. The receptors or detectors then send signals to a processor or control logic to interpret the signals. In one embodiment, system 400 includes detectors on chip with the other LIDAR photonics components. Such detectors are not explicitly shown. The detectors could alternatively be off-chip. The detectors provide the reflection signals to autocorrelator 474 for autocorrelation compared to the transmitted bit sequence of the transmitted light. The autocorrelation can improve the SNR for depth perception of system 400.

Figure 5B:
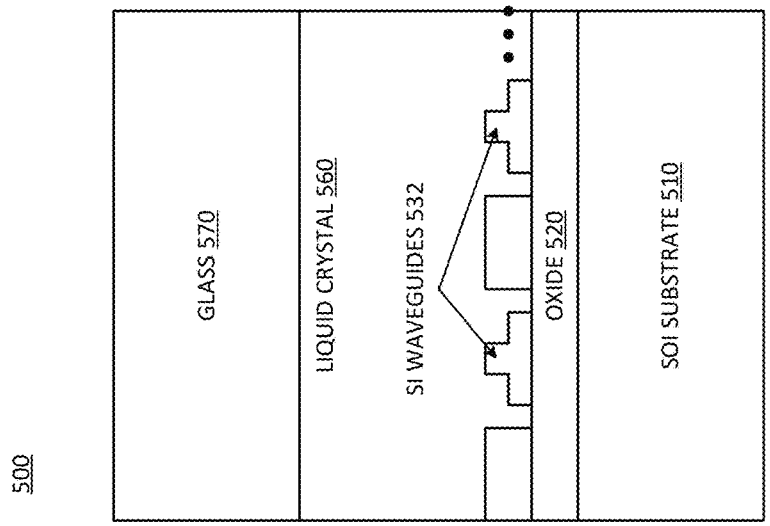
FIGS. 5A-5B are block diagrams of an embodiment of cross sections of an integrated solid state LIDAR circuit.
Figure 5A:
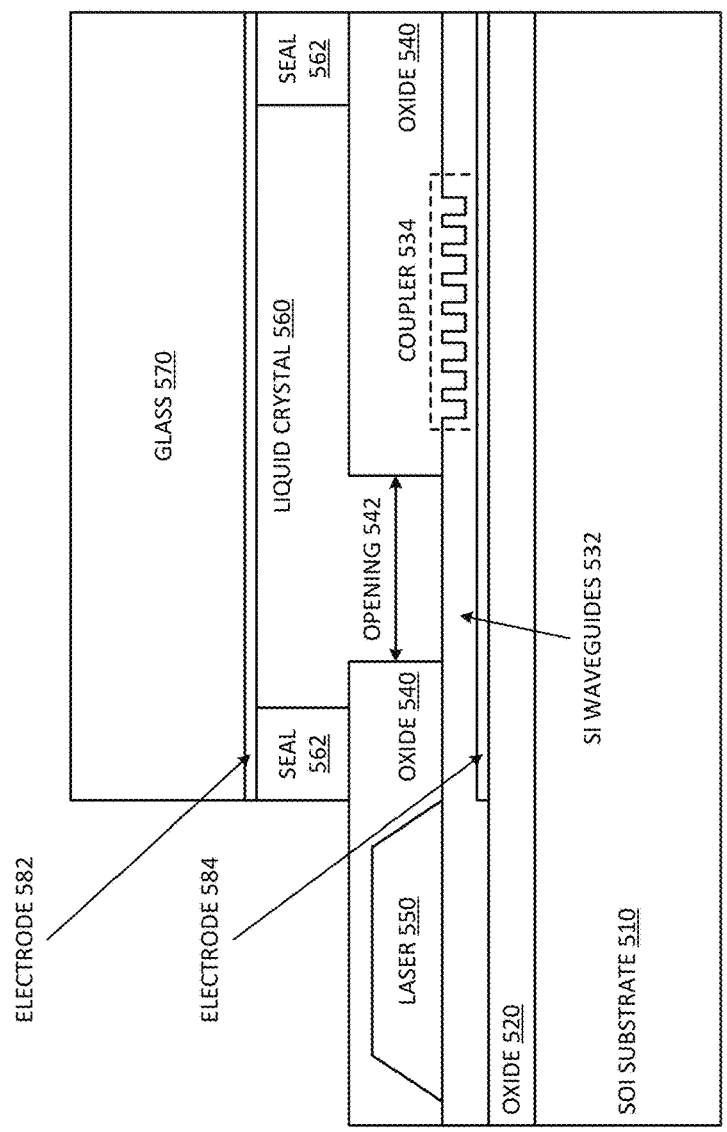

FIGS. 5A-5B are block diagrams of an embodiment of cross sections of an integrated solid state LIDAR circuit. Circuit 500 represents elements of a solid state LIDAR engine chip, and can be an example of a solid state LIDAR in accordance with an embodiment described herein. In one embodiment, circuit 500 is based on silicon photonics circuits as illustrated, but in another embodiment, other semiconductor architectures can be used to create a solid state LIDAR chip. FIG. 5A illustrates an embodiment of a cross section of the LIDAR engine photonics. FIG. 5B illustrates the LIDAR engine photonics of FIG. 5A from a cross section view of a portion of a silicon waveguide array.

Circuit 500 includes SOI (silicon on insulator) substrate 510, which can be used as a substrate on which to process silicon photonics. Oxide layer 520 can represent the insulator of substrate 510. Silicon waveguide 532 can be processed into substrate 510 to couple light from laser 550 to coupler 534. In one embodiment, laser 550 is integrated directly on substrate 510 (and can include a modulator). In one embodiment, what is illustrated as laser 550 represents an area where laser light is coupled into circuit 500 from an off-chip laser. Silicon waveguide 532 represents the waveguide array, as mentioned herein, and as shown more specifically in FIG. 5B.

Oxide 540 represents an oxide layer or cladding oxide adjacent the photonics components, and covers the silicon photonics of circuit 500. Oxide 540 includes opening 542, which exposes waveguide 532 to liquid crystal 560. Thus, circuit 500 more specifically illustrates an example of an LCOS phase control circuit. It will be understood that other implementations of phase tuning are also possible, as described herein. In the cross section of FIG. 5B, oxide 540 is not shown, because the cross section is provided for an area of circuit 500 where waveguides 532 are not covered by oxide 540, but are exposed to liquid crystal 560 (i.e., opening 542). In one embodiment, liquid crystal 560 is an area surrounded by seal 562 that is processed on substrate 510. In one embodiment, such processing is part of a different processing routine than what is used to create the silicon or other semiconductor photonics components. The different processing routine is not necessarily even carried out on the same processing line or processing facility. Glass 570 is a cap layer for circuit 500, and represents a material that is optically transparent at the wavelength(s) of interest, referring to the wavelength(s) of light emitted via coupler 534.

Coupler 534 represents a coupling mechanism that changes the direction of the light signal, to emit the signal that travels through waveguide 532 to pass out through glass 570 to the imaging target. In one embodiment, coupler 534 is a grating coupler. In one embodiment, coupler 534 is a mirror-based coupler. In one embodiment, coupler 534 represents an array of couplers, just as waveguide 532 represents a waveguide array. There can be a coupler for each waveguide, or another configuration that will allow the phase delayed signals to emit out of circuit 500. It will be understood that gratings are wavelength dependent. But by wavelength tuning the laser, system 500 can steer the beam even with a wavelength dependent grating.

It will be understood that liquid crystal 560 needs two electrodes to create a voltage that causes the phase shifting in waveguide array 532. In one embodiment, electrode 582 is located between liquid crystal layer 560 and glass layer 570. In one embodiment, electrode 584 is located between waveguide 532 and oxide 520. Applying a voltage between electrodes 582 and 584 can change an index of refraction of interface between liquid crystal 560 and waveguide 532. In one embodiment, electrode 582 is an indium tin oxide (ITO) material. In one embodiment, electrode 584 is a material deposited on oxide 520. In another embodiment, system 500 biases liquid crystal 560 directly to the waveguide, in which case electrode 584 can represent doping of waveguide 532. By adjusting the electric field on liquid crystal 560 next to waveguide 532, system 500 can change the phase delay, which will steer/form the wave front of the emitted beam. The electric field near waveguide 532 can be changed by applying a voltage between silicon features within the wafer (electrode 584) and/or a voltage on the electrode on the glass wafer (electrode 582). The phase change can occur via thermal phase control or based on a free carrier effect.

Similar to what is described with respect to system 400, circuit 500 can generate 3D data from a scene without the use of mechanical beamsteering or broadcast illumination. Liquid crystal 560 interfaces directly with waveguides 532 via opening 542 in oxide 540. Liquid crystal 560 creates a phased array of signals from the light signals split into an array of waveguides 532. Overlaid liquid crystal 560 can tune the refractive index of each beam component as provided in the separate waveguides 532 by application of a voltage. The waveguides transfer the phased array of signals to coupler(s) 534, which can also be referred to as emitters, to transmit the signals out of system 500. Thus, the light signal can be a steered beam emitted from the circuit or chip and monitoring hardware (e.g., photodetectors and processing hardware) can monitor a far field beam shape formed by the relative phases introduced into the individual components of the optical signal.

Circuit 500 can provide several advantages over traditional LIDAR systems. In one embodiment, circuit 500 can provide a single-chip solution, fully integrated with lasers and detectors and batch fabricated using existing fabrication processes. Such a single-chip solution can provide substantial cost savings in space as well as the cost of manufacture. The primary cost of traditional LIDAR systems arises from the complex and precise assembly of many optical and mechanical elements, which can be eliminated with an embodiment of system 500. In one embodiment, a LIDAR system in accordance with system 500 does not include any moving parts, but can perform all beam steering electrically via application of voltages to electrodes 582 and 584 (and thus to liquid crystal 560). System 500 is also inherently lower power as compared to traditional LIDAR system, given that the steering mechanism does not involve any motorization, but rather voltage applied across a solid-state capacitor to vary the field in the liquid crystal. As discussed above, varying the field in the liquid crystal can phase-adjust the components of the beam as transferred in each separate waveguide 532. In one embodiment, system 500 can reduce sensitivity of the LIDAR to ambient light or other nearby LIDAR systems by encoding the beam with an on-chip modulator (not specifically shown in 500, but can be included in accordance with an embodiment described herein).

In one embodiment, while not explicitly shown, system 500 includes an integrated high speed modulator to modulate a high bit rate signal onto the optical beam for transmission. Modulating a known bit sequence onto the transmitted optical beam enables a receiver associated with system 500 to receive reflected light and send it to processing logic to perform autocorrelation. The autocorrelation can be in accordance with any embodiment described herein, where a detected signal reflection is compared with the known bit sequence to perform the autocorrelation.

Figure 6:
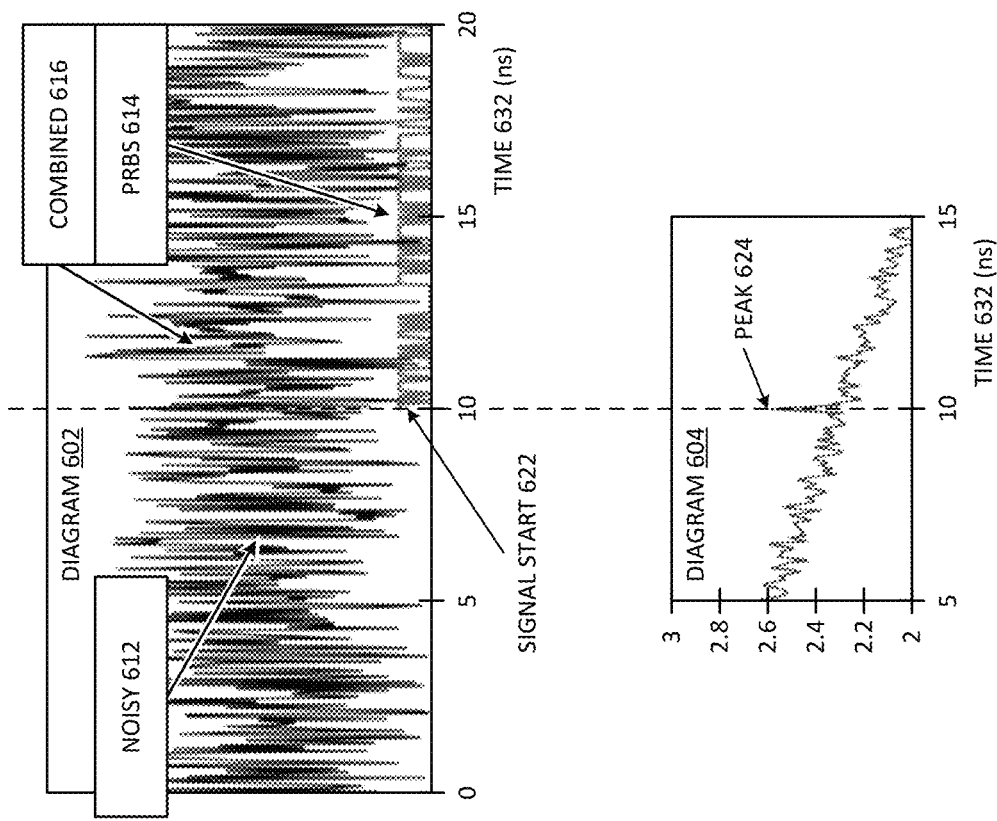
FIG. 6 is a diagrammatic representation of a pseudorandom bit sequence modulated onto a phased LIDAR output signal for an embodiment of a photonic integrated circuit.

FIG. 6 is a diagrammatic representation of a pseudorandom bit sequence modulated onto a phased LIDAR output signal for an embodiment of a photonic integrated circuit. Diagrams 602 and 604 illustrate an example of signal-tonoise improvement by autocorrelating a known PRBS transmitted signal with a noisy return signal. Diagram 602 shows noisy signal 612, which has PRBS pattern 614 encoded into it beginning at 10 ns, at signal start 622. Combined signal 616 represents the combination of noisy signal 612 with PRBS pattern 614 encoded into it.

Diagram 604 includes the same time axis 632, and is aligned with diagram 602 along axis 632. Diagram 604 illustrates one example of an autocorrelation function of PRBS pattern 614 with noisy signal 612/combined signal 616. Although the signal is too noisy to see the encoded bit pattern from the autocorrelation in diagram 604, the autocorrelation shows a clear peak 624 at 10 ns corresponding to signal start 622, or the location of the bit stream in the noise. In one embodiment, peak 624 identifies when the reflection signal comes back. Whether the autocorrelation represented in diagram 604 is performed digitally as a buffered and processed signal with a delay circuit, or whether performed as an analog overlay (with a linear phase shift and multiplication) of the transmit pattern and the receive signal, in one embodiment, the autocorrelation can identify a peak or other indication of the detection of the signal. Peak 624 can be used by signal processing circuits to determine timing related to the signal, and determine ranging and depth information from the timing.

Figure 7:
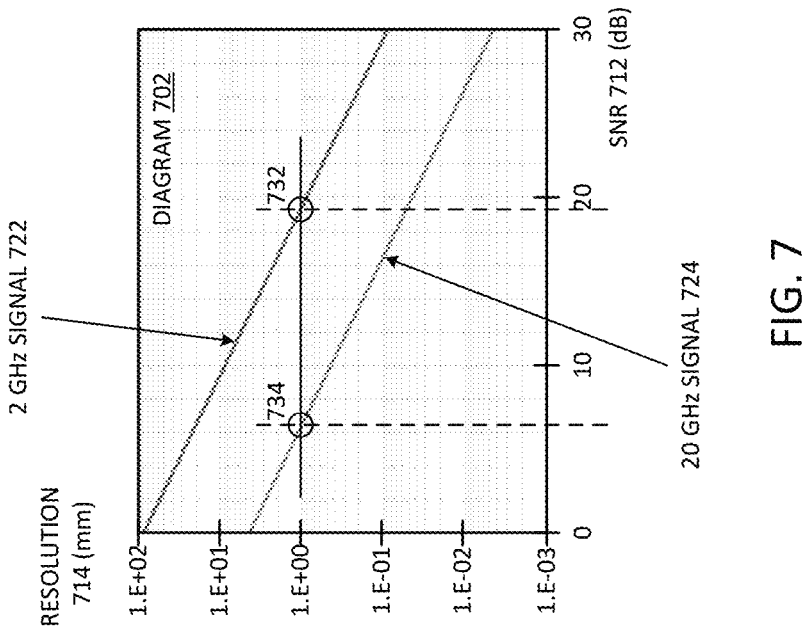
FIG. 7 is a diagrammatic representation of a plot of signal to noise for pseudorandom bit sequences of different bandwidth for an embodiment of a solid state LIDAR circuit.

FIG. 7 is a diagrammatic representation of a plot of signal to noise for pseudorandom bit sequences of different bandwidth for an embodiment of a solid state LIDAR circuit. Diagram 702 illustrates one example of a plot of calculated range resolution versus required SNR for a 50 ns collection time. Diagram 702 was generated from theoretical calculations of a LIDAR system using high speed modulation and digital autocorrelation. The results are generally representative of expected behavior of a photonic IC with modulation and autocorrelation in accordance with any embodiment described herein.

Diagram 702 illustrates simulated results of achievable depth precision versus required SNR for two separate bit rate, as calculated according to the Cramer-Rao lower bound. Diagram 702 illustrates the effects of bit pattern modulation data rate on SNR. SNR 712 (measured in dB) is plotted against the log of resolution 714 (measured in millimeters). By modulating a known bit pattern onto an optical signal of a LIDAR system and autocorrelating that modulated bit pattern with signal echoes detected by a receiver, the system can adjust the tradeoff.

Signal 722 represents a 2 GHz signal or 2 Gb/s signal modulated into a ranging light beam. It will be observed at point 732 on the graph that for 1 mm depth precision, which is the precision needed to capture facial expression changes and/or hand/finger gestures, 2 GHz signal 722 requires nearly 20 dB SNR. Signal 724 represents a 20 GHz signal or a 20 Gb/s signal modulated into the ranging light beam. It will be observed at point 734 on the graph that for the same 1 mm depth precision, 20 GHz signal 724 requires only 6 dB SNR. Such performance is achievable in accordance with an embodiment of a LIDAR system described herein.

It will be understood that the autocorrelation as described does not require coherent detection. Rather, standard square-law detection provides sufficient performance because the bit pattern is used to determine the delay of the returning reflection signal, rather than the phase of the optical carrier. The delay of the returning reflection signal can be used to calculate range to the reflector in the far-field, where the reflector is a surface of a target object or environment being scanned.

Figure 8:
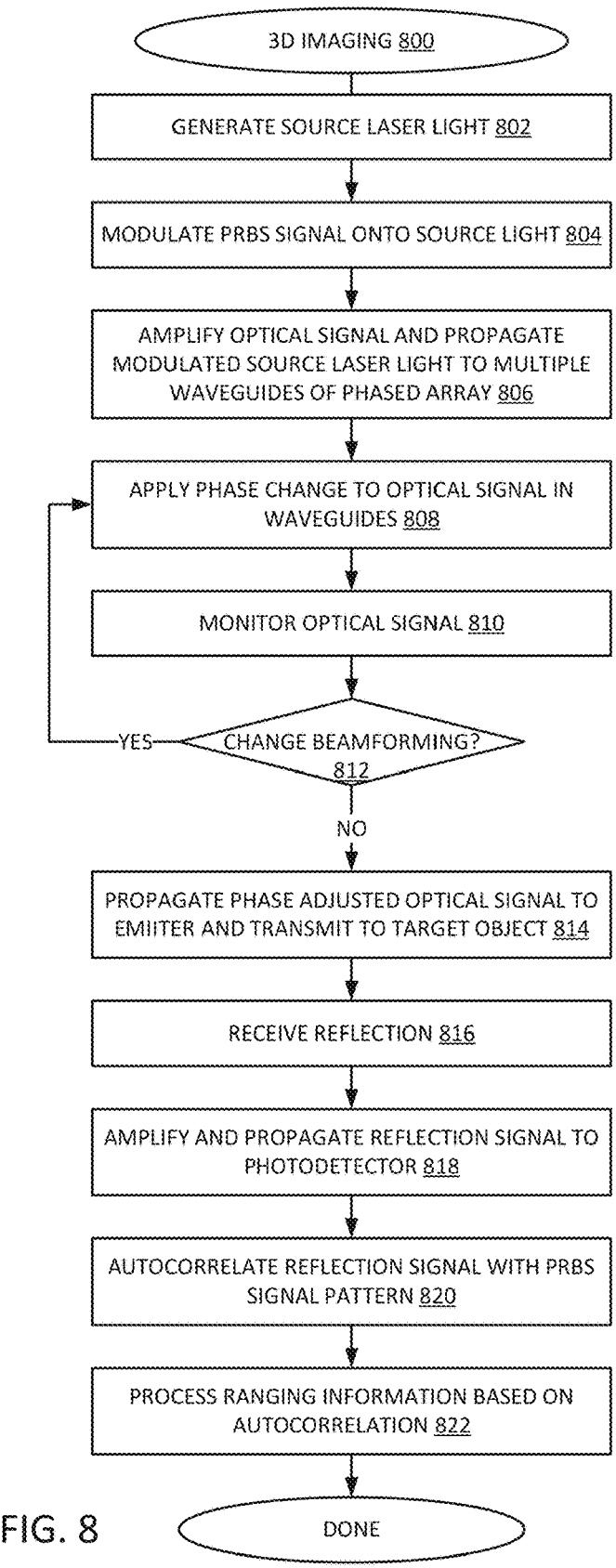
FIG. 8 is a flow diagram of an embodiment of a process for imaging with a solid state LIDAR circuit.

FIG. 8 is a flow diagram of an embodiment of a process for imaging with a solid state LIDAR circuit. An embodiment of process 800 for 3D imaging can be executed by a solid state LIDAR engine in accordance with an embodiment described herein. A LIDAR system generates a source laser light signal, 802. In one embodiment, the laser is a laser integrated on the same LIDAR engine circuit that includes a phased waveguide array and beamsteering circuitry. In one embodiment, the LIDAR system includes a modulator to modulate a bit pattern into the source light, 804. In one embodiment, the modulation is amplitude modulation. The modulation can be high-speed modulation of a PRBS signal. In one embodiment, the modulated optical signal can be used as a reference signal for autocorrelation of the bit pattern in a received reflection.

In one embodiment, the LIDAR system amplifies the optical signal and propagates the modulated source laser light to multiple waveguides of a phased array, 806. The propagation to the phased array can include the use of couples, multiplexer/demultiplexer, splitter, and/or other components. The phased array can include any type of phase control that can be integrated into a LIDAR circuit, such as those described herein. In one embodiment, the LIDAR system applies a phase change to the optical signals in the waveguides, 808. The application of the phase change can beamsteer the optical signal. Other beamsteering operations can also or alternatively be performed. In one embodiment, the system monitors the optical signal to determine how to adjust the beam for sweeping across a target, 810.

If the system determines to change the beamforming, 812 YES branch, in one embodiment, the system applies a new phase change to the optical signal, 808. If no beamforming changes are needed, 812 NO branch, in one embodiment, the system propagates the phase adjusted optical signal to an emitter or emitter array to transmit to the target object, 814. The transmitted signal will reflect off the target and cause reflections to return to the LIDAR system. The LIDAR system can receive the reflections, including capturing reflected light with one or more photodetectors, 816. In one embodiment, the LIDAR system amplifies and propagates the reflection signal to the photodetectors, 818. The detectors can be on the same chip as the LIDAR engine, or a different chip.

In one embodiment, the LIDAR system passes the received light to an autocorrelation circuit to autocorrelate the reflection signal with the PRBS signal pattern, 820. The autocorrelation can provide much higher precision to ranging determinations, resulting in a high precision LIDAR that does not require a high power output signal. The autocorrelation logic can pass the autocorrelation information to a processor that computes ranging information based on the autocorrelation information, 822. The processing can include signal processing to generate a 3D image or mapping of the target.

Figure 9:
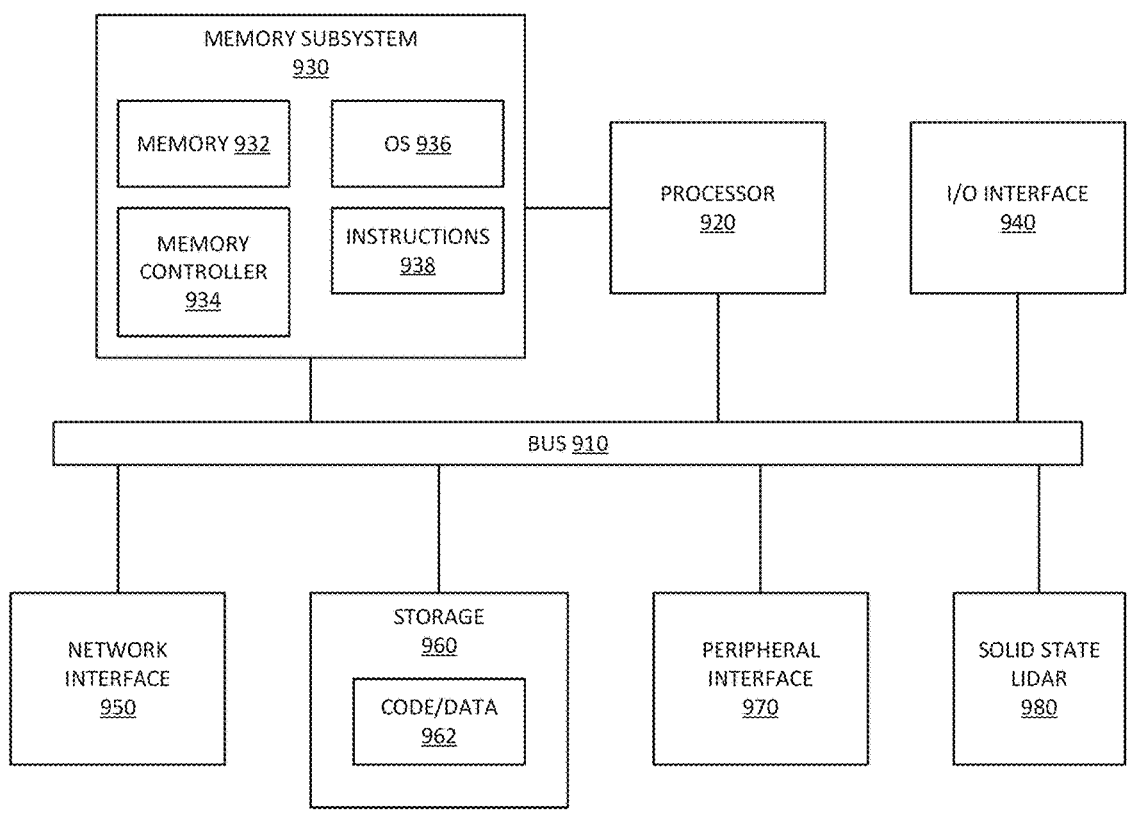
FIG. 9 is a block diagram of an embodiment of a computing system in which a low power, high resolution solid state LIDAR circuit can be implemented.

FIG. 9 is a block diagram of an embodiment of a computing system in which a low power, high resolution solid state LIDAR circuit can be implemented. System 900 represents a computing device in accordance with any embodiment described herein, and can be a laptop computer, a desktop computer, a server, a gaming or entertainment control system, a scanner, copier, printer, routing or switching device, or other electronic device. System 900 includes processor 920, which provides processing, operation management, and execution of instructions for system 900. Processor 920 can include any type of microprocessor, central processing unit (CPU), processing core, or other processing hardware to provide processing for system 900.

Processor 920 controls the overall operation of system 900, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

Memory subsystem 930 represents the main memory of system 900, and provides temporary storage for code to be executed by processor 920, or data values to be used in executing a routine. Memory subsystem 930 can include one or more memory devices such as read-only memory (ROM), flash memory, one or more varieties of random access memory (RAM), or other memory devices, or a combination of such devices. Memory subsystem 930 stores and hosts, among other things, operating system (OS) 936 to provide a software platform for execution of instructions in system 900. Additionally, other instructions 938 are stored and executed from memory subsystem 930 to provide the logic and the processing of system 900. OS 936 and instructions 938 are executed by processor 920. Memory subsystem 930 includes memory device 932 where it stores data, instructions, programs, or other items. In one embodiment, memory subsystem includes memory controller 934, which is a memory controller to generate and issue commands to memory device 932. It will be understood that memory controller 934 could be a physical part of processor 920.

Processor 920 and memory subsystem 930 are coupled to bus/bus system 910. Bus 910 is an abstraction that represents any one or more separate physical buses, communication lines/interfaces, and/or point-to-point connections, connected by appropriate bridges, adapters, and/or controllers. Therefore, bus 910 can include, for example, one or more of a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (commonly referred to as "Firewire"). The buses of bus 910 can also correspond to interfaces in network interface 950.

System 900 also includes one or more input/output (I/O) interface(s) 940, network interface 950, one or more internal mass storage device(s) 960, and peripheral interface 970 coupled to bus 910. I/O interface 940 can include one or more interface components through which a user interacts with system 900 (e.g., video, audio, and/or alphanumeric interfacing). Network interface 950 provides system 900 the ability to communicate with remote devices (e.g., servers, other computing devices) over one or more networks. Network interface 950 can include an Ethernet adapter, wireless interconnection components, USB (universal serial bus), or other wired or wireless standards-based or proprietary interfaces.

Storage 960 can be or include any conventional medium for storing large amounts of data in a nonvolatile manner, such as one or more magnetic, solid state, or optical based disks, or a combination. Storage 960 holds code or instructions and data 962 in a persistent state (i.e., the value is retained despite interruption of power to system 900). Storage 960 can be generically considered to be a "memory," although memory 930 is the executing or operating memory to provide instructions to processor 920. Whereas storage 960 is nonvolatile, memory 930 can include volatile memory (i.e., the value or state of the data is indeterminate if power is interrupted to system 900).

Peripheral interface 970 can include any hardware interface not specifically mentioned above. Peripherals refer generally to devices that connect dependently to system 900. A dependent connection is one where system 900 provides the software and/or hardware platform on which operation executes, and with which a user interacts.

In one embodiment, system 900 includes solid state LIDAR 980, which can be or include a photonics IC in accordance with any embodiment described herein. In one embodiment, LIDAR 980 is a system that includes one or more chips, which allows the LIDAR to perform non-mechanical beam forming/steering of a light signal to perform 3D imaging. LIDAR 980 includes a modulator to modulate a bit sequence onto the optical ranging signal, such as a PRBS bit pattern, and includes or provides detected light to an autocorrelator to perform autocorrelation of the modulated bit sequence with the received signal. The autocorrelation can provide more precise timing detection, improving the SNR for signal reflections, and improving the resolution of range detection. In one embodiment, LIDAR 980 can be a single chip that is packaged together with other components of system 900. In one embodiment, LIDAR 980 sends imaging information (which can include reference signals) to processor 920 for processing. LIDAR 980 can include a LIDAR engine circuit in accordance with any embodiment described herein, and enables system 900 for a variety of different imaging applications with a high resolution, low power optical system.

Figure 10:
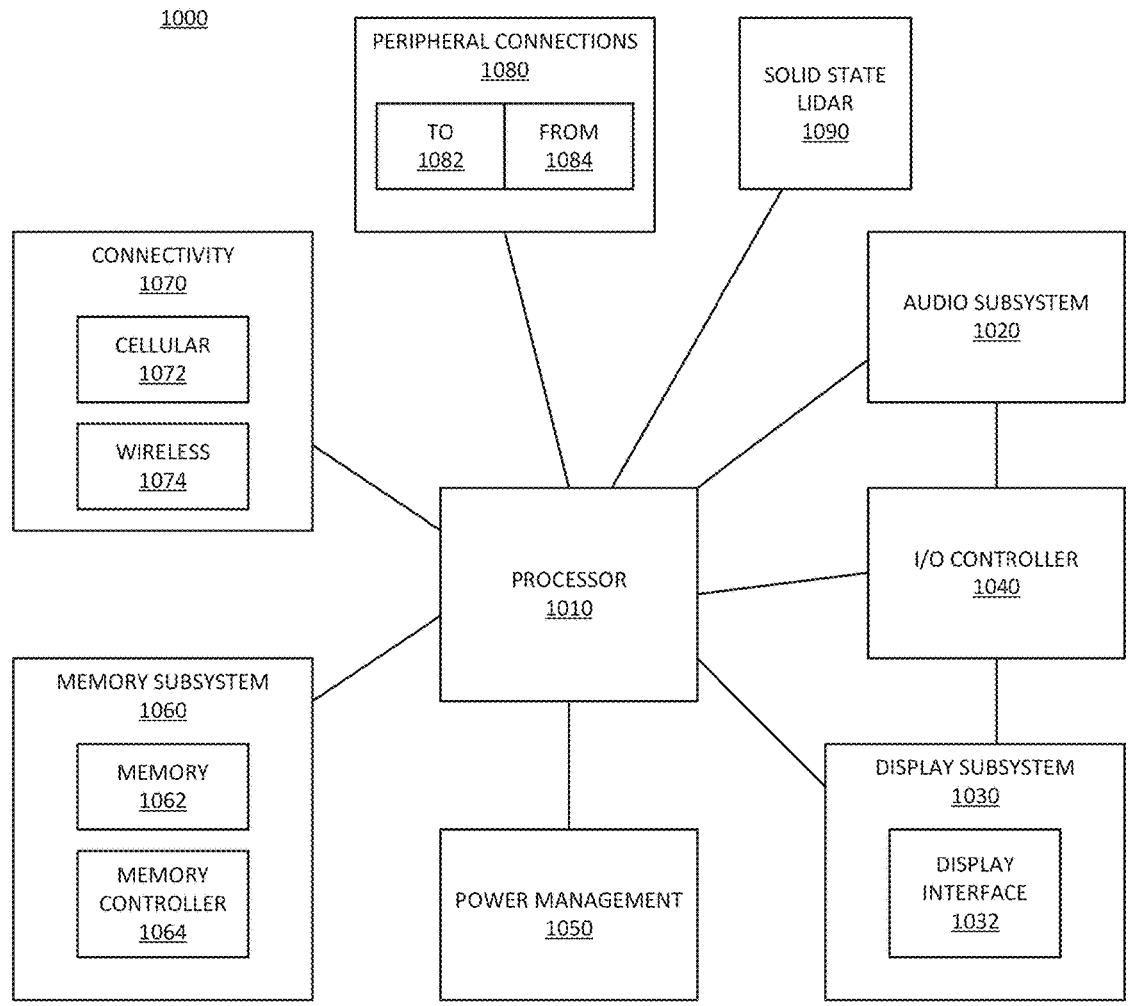
FIG. 10 is a block diagram of an embodiment of a mobile device in which a low power, high resolution solid state LIDAR circuit can be implemented.

FIG. 10 is a block diagram of an embodiment of a mobile device in which a low power, high resolution solid state LIDAR circuit can be implemented. Device 1000 represents a mobile computing device, such as a computing tablet, a mobile phone or smartphone, a wireless-enabled e-reader, wearable computing device, or other mobile device. It will be understood that certain of the components are shown generally, and not all components of such a device are shown in device 1000.

Device 1000 includes processor 1010, which performs the primary processing operations of device 1000. Processor 1010 can include one or more physical devices, such as microprocessors, application processors, microcontrollers, programmable logic devices, or other processing means. The processing operations performed by processor 1010 include the execution of an operating platform or operating system on which applications and/or device functions are executed. The processing operations include operations related to I/O (input/output) with a human user or with other devices, operations related to power management, and/or operations related to connecting device 1000 to another device. The processing operations can also include operations related to audio I/O and/or display I/O.

In one embodiment, device 1000 includes audio subsystem 1020, which represents hardware (e.g., audio hardware and audio circuits) and software (e.g., drivers, codecs) components associated with providing audio functions to the computing device. Audio functions can include speaker and/or headphone output, as well as microphone input. Devices for such functions can be integrated into device 1000, or connected to device 1000. In one embodiment, a user interacts with device 1000 by providing audio commands that are received and processed by processor 1010.

Display subsystem 1030 represents hardware (e.g., display devices) and software (e.g., drivers) components that provide a visual and/or tactile display for a user to interact with the computing device. Display subsystem 1030 includes display interface 1032, which includes the particular screen or hardware device used to provide a display to a user. In one embodiment, display interface 1032 includes logic separate from processor 1010 to perform at least some processing related to the display. In one embodiment, display subsystem 1030 includes a touchscreen device that provides both output and input to a user.

I/O controller 1040 represents hardware devices and software components related to interaction with a user. I/O controller 1040 can operate to manage hardware that is part of audio subsystem 1020 and/or display subsystem 1030. Additionally, I/O controller 1040 illustrates a connection point for additional devices that connect to device 1000 through which a user might interact with the system. For example, devices that can be attached to device 1000 might include microphone devices, speaker or stereo systems, video systems or other display device, keyboard or keypad devices, or other I/O devices for use with specific applications such as card readers or other devices.

As mentioned above, I/O controller 1040 can interact with audio subsystem 1020 and/or display subsystem 1030. For example, input through a microphone or other audio device can provide input or commands for one or more applications or functions of device 1000. Additionally, audio output can be provided instead of or in addition to display output. In another example, if display subsystem includes a touchscreen, the display device also acts as an input device, which can be at least partially managed by I/O controller 1040. There can also be additional buttons or switches on device 1000 to provide I/O functions managed by I/O controller 1040.

In one embodiment, I/O controller 1040 manages devices such as accelerometers, cameras, light sensors or other environmental sensors, gyroscopes, global positioning system (GPS), or other hardware that can be included in device 1000. The input can be part of direct user interaction, as well as providing environmental input to the system to influence its operations (such as filtering for noise, adjusting displays for brightness detection, applying a flash for a camera, or other features). In one embodiment, device 1000 includes power management 1050 that manages battery power usage, charging of the battery, and features related to power saving operation.

Memory subsystem 1060 includes memory device(s) 1062 for storing information in device 1000. Memory subsystem 1060 can include nonvolatile (state does not change if power to the memory device is interrupted) and/or volatile (state is indeterminate if power to the memory device is interrupted) memory devices. Memory 1060 can store application data, user data, music, photos, documents, or other data, as well as system data (whether long-term or temporary) related to the execution of the applications and functions of system 1000. In one embodiment, memory subsystem 1060 includes memory controller 1064 (which could also be considered part of the control of system 1000, and could potentially be considered part of processor 1010). Memory controller 1064 includes a scheduler to generate and issue commands to memory device 1062.

Connectivity 1070 includes hardware devices (e.g., wireless and/or wired connectors and communication hardware) and software components (e.g., drivers, protocol stacks) to enable device 1000 to communicate with external devices. The external device could be separate devices, such as other computing devices, wireless access points or base stations, as well as peripherals such as headsets, printers, or other devices.

Connectivity 1070 can include multiple different types of connectivity. To generalize, device 1000 is illustrated with cellular connectivity 1072 and wireless connectivity 1074. Cellular connectivity 1072 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, LTE (long term evolution—also referred to as "4G"), or other cellular service standards. Wireless connectivity 1074 refers to wireless connectivity that is not cellular, and can include personal area networks (such as Bluetooth), local area networks (such as WiFi), and/or wide area networks (such as WiMax), or other wireless communication. Wireless communication refers to transfer of data through the use of modulated electromagnetic radiation through a non-solid medium. Wired communication occurs through a solid communication medium.

Peripheral connections 1080 include hardware interfaces and connectors, as well as software components (e.g., drivers, protocol stacks) to make peripheral connections. It will be understood that device 1000 could both be a peripheral device ("to" 1082) to other computing devices, as well as have peripheral devices ("from" 1084) connected to it. Device 1000 commonly has a "docking" connector to connect to other computing devices for purposes such as managing (e.g., downloading and/or uploading, changing, synchronizing) content on device 1000. Additionally, a docking connector can allow device 1000 to connect to certain peripherals that allow device 1000 to control content output, for example, to audiovisual or other systems.

In addition to a proprietary docking connector or other proprietary connection hardware, device 1000 can make peripheral connections 1080 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other type.

In one embodiment, system 1000 includes solid state LIDAR 1090, which can be or include a photonics IC in accordance with any embodiment described herein. In one embodiment, LIDAR 1090 is a system that includes one or more chips, which allows the LIDAR to perform non-mechanical beam forming/steering of a light signal to perform 3D imaging. LIDAR 1090 includes a modulator to modulate a bit sequence onto the optical ranging signal, such as a PRBS bit pattern, and includes or provides detected light to an autocorrelator to perform autocorrelation of the modulated bit sequence with the received signal. The autocorrelation can provide more precise timing detection, improving the SNR for signal reflections, and improving the resolution of range detection. In one embodiment, LIDAR 1090 can be a single chip that is packaged together with other components of system 1000. In one embodiment, LIDAR 1090 sends imaging information (which can include reference signals) to processor 1010 for processing. LIDAR 1090 can include a LIDAR engine circuit in accordance with any embodiment described herein, and enables system 1000 for a variety of different imaging applications with a high resolution, low power optical system.

In one aspect, an optical circuit includes: a phased array of solid state waveguides to receive an optical signal and transmit the optical signal as a beamsteered optical signal; a modulator circuit coupled to modulate a bit sequence onto a carrier frequency of the optical signal; and a photodetector to detect a reflection signal of the beamsteered optical signal, and transmit the reflection signal for autocorrelation with the bit sequence to generate a processed signal.

In one embodiment, the bit sequence comprises a pseudorandom bit sequence (PRBS). In one embodiment, the PRBS comprises a series of PRBS pulses separated by white noise. In one embodiment, the photodetector comprises a photodetector circuit integrated on a common substrate with the phased array, wherein the photodetector and the phased array share a common optical lens. In one embodiment, the photodetector comprises a photodetector circuit integrated on a substrate separate from a substrate of the phased array. In one embodiment, the autocorrelation comprises digital autocorrelation. In one embodiment, the autocorrelation comprises analog autocorrelation. In one embodiment, the autocorrelation comprises non-coherent autocorrelation on the reflection signal.

In one aspect, an electronic device includes: an integrated photonic circuit including a phased array of solid state waveguides to receive an optical signal and transmit the optical signal as a beamsteered optical signal; a modulator circuit coupled to modulate a bit sequence onto a carrier frequency of the optical signal; and a photodetector to detect a reflection signal of the beamsteered optical signal; a processor to autocorrelate the reflection signal with the bit sequence to generate a processed signal; and an adjustable lens coupled to focus the transmitted optical signal from the phased array.

In one embodiment, the bit sequence comprises a pseudorandom bit sequence (PRBS). In one embodiment, the PRBS comprises a series of PRBS pulses separated by white noise. In one embodiment, the photodetector comprises a photodetector circuit integrated on a common substrate with the phased array. In one embodiment, the photodetector comprises a photodetector circuit integrated on a substrate separate from a substrate of the phased array. In one embodiment, the processor to autocorrelate the reflection signal comprises a processor with digital autocorrelation logic. In one embodiment, the processor to autocorrelate the reflection signal comprises a processor with analog autocorrelation logic. In one embodiment, the processor to perform non-coherent autocorrelation on the reflection signal.

In one aspect, a method for range detection includes: modulating a bit sequence onto a carrier frequency of an optical signal; receiving the optical signal with the modulated bit sequence at a phased array of solid state waveguides; transmitting the optical signal with the modulated bit sequence from the phased array of solid state waveguides as a beamsteered optical signal; receiving a reflection signal from the transmitted signal reflecting off an object; and autocorrelating the reflection signal with the bit sequence to generate a processed signal.

In one embodiment, modulating the bit sequence comprises a modulating a pseudorandom bit sequence (PRBS). In one embodiment, the PRBS comprises a series of PRBS pulses combined with noise. In one embodiment, the PRBS comprises a series of PRBS pulses separated by white noise. In one embodiment, the photodetector comprises a photodetector circuit integrated on a common substrate with the phased array, wherein the photodetector and the phased array share a common optical lens. In one embodiment, receiving the reflection signal comprises receiving the reflection signal with a photodetector circuit integrated on a common substrate with the phased array. In one embodiment, autocorrelating comprises performing digital autocorrelation. In one embodiment, autocorrelating comprises performing analog autocorrelation. In one embodiment, autocorrelating comprises performing non-coherent autocorrelation on the reflection signal.

Flow diagrams as illustrated herein provide examples of sequences of various process actions. The flow diagrams can indicate operations to be executed by a software or firmware routine, as well as physical operations. In one embodiment, a flow diagram can illustrate the state of a finite state machine (FSM), which can be implemented in hardware and/or software. Although shown in a particular sequence or order, unless otherwise specified, the order of the actions can be modified. Thus, the illustrated embodiments should be understood only as an example, and the process can be performed in a different order, and some actions can be performed in parallel. Additionally, one or more actions can be omitted in various embodiments; thus, not all actions are required in every embodiment. Other process flows are possible.

To the extent various operations or functions are described herein, they can be described or defined as software code, instructions, configuration, and/or data. The content can be directly executable ("object" or "executable" form), source code, or difference code ("delta" or "patch" code). The software content of the embodiments described herein can be provided via an article of manufacture with the content stored thereon, or via a method of operating a communication interface to send data via the communication interface. A machine readable storage medium can cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content. The communication interface can be accessed via one or more commands or signals sent to the communication interface.

Various components described herein can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications can be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. An optical circuit comprising:
a modulator to receive an optical signal and modulate a bit sequence onto a carrier frequency of the optical signal;
a group of solid state waveguides coupled to the modulator to convey the optical signal for emission from a group of optical emitters, the emission including beamsteering the modulated signal with the bit sequence; and
a photodetector to detect an echo, the echo being a reflection signal of the emitted signal, and transmit the echo for autocorrelation with the bit sequence to determine a time of flight of the emitted signal.

2. The optical circuit of claim 1, wherein the bit sequence comprises a non-periodic pattern of bits.

3. The optical circuit of claim 2, wherein the bit sequence comprises a pseudorandom bit sequence (PRBS).

4. The optical circuit of claim 3, wherein the PRBS comprises a series of PRBS pulses separated by white noise.

5. The optical circuit of claim 1, wherein the bit sequence comprises hundreds of bits.

6. The optical circuit of claim 1, wherein the photodetector comprises a photodetector circuit integrated on a common substrate with the group of solid state waveguides, wherein the photodetector and the group of solid state waveguides share a common optical lens.

7. The optical circuit of claim 1, wherein the photodetector comprises a photodetector circuit integrated on a substrate separate from a substrate of the group of solid state waveguides.

8. The optical circuit of claim 1, wherein the autocorrelation comprises digital autocorrelation.

9. The optical circuit of claim 1, wherein the autocorrelation comprises analog autocorrelation.

10. The optical circuit of claim 1, wherein the autocorrelation comprises non-coherent autocorrelation on the reflection signal.

11. A sensor device comprising:
an integrated photonic circuit including
a modulator to receive an optical signal and modulate a bit sequence onto a carrier frequency of the optical signal; and
a group of solid state waveguides coupled to the modulator to convey the optical signal for emission from a group of optical emitters, the emission including beamsteering the modulated signal with the bit sequence; and
a photodetector to detect an echo, the echo being a reflection signal of the emitted signal, and transmit the echo for autocorrelation with the bit sequence to determine a time of flight of the emitted signal; and
an adjustable lens coupled to focus the emitted optical signal from the group of solid state waveguides.

12. The sensor device of claim 11, wherein the bit sequence comprises a non-periodic pattern of bits.

13. The sensor device of claim 12, wherein the bit sequence comprises a pseudorandom bit sequence (PRBS).

14. The sensor device of claim 13, wherein the PRBS comprises a series of PRBS pulses separated by white noise.

15. The sensor device of claim 11, wherein the bit sequence comprises hundreds of bits.

16. The sensor device of claim 11, wherein the photodetector comprises a photodetector circuit integrated on a common substrate with the group of solid state waveguides, wherein the photodetector and the group of solid state waveguides share a common optical lens.

17. The sensor device of claim 11, wherein the photodetector comprises a photodetector circuit integrated on a substrate separate from a substrate of the group of solid state waveguides.

18. The sensor device of claim 11, wherein the autocorrelation comprises digital autocorrelation.

19. The sensor device of claim 11, wherein the autocorrelation comprises analog autocorrelation.

20. The sensor device of claim 11, wherein the autocorrelation comprises non-coherent autocorrelation on the reflection signal.

* * * * *